United States Patent [19]

Arlington et al.

[11] Patent Number: 4,888,773
[45] Date of Patent: Dec. 19, 1989

[54] SMART MEMORY CARD ARCHITECTURE AND INTERFACE

[75] Inventors: David L. Arlington, Chittenden County, Vt.; Jacqueline M. Cole, Broome County, N.Y.; Bruce G. Hazelzet; David J. Krolak, both of Crittenden County, Vt.; Hehching H. Li, Tioga County; Bharat J. Oza, Broome County, both of N.Y.; A. Frank Weaver, Chittenden County, Vt.

[73] Assignee: International Business Machines Corporation, Armonk, N.Y.

[21] Appl. No.: 206,757

[22] Filed: Jun. 15, 1988

[51] Int. Cl.⁴ .............................................. G06F 11/10
[52] U.S. Cl. .................................. 371/40.2; 364/900; 364/944.92; 365/189.02
[58] Field of Search ...................... 371/38, 21, 10, 13; 365/200; 235/492, 379, 380; 364/200 MS File, 900 MS File

[56] References Cited

U.S. PATENT DOCUMENTS

| | | | |
|---|---|---|---|
| 4,317,201 | 2/1982 | Sedalis | 371/38 |
| 4,556,958 | 12/1985 | Ugon | 235/492 X |
| 4,710,934 | 12/1987 | Traynor | 371/38 |

OTHER PUBLICATIONS

"Fully Self-Contained Memory Card Extended Error Checking/Correcting Hardware Implementation", IBMTAB, vol. 31, No. 5, Oct./1988, pp. 352-355.

Primary Examiner—Jerry Smith
Assistant Examiner—Robert W. Beausoliel
Attorney, Agent, or Firm—Whitham & Marhoefer

[57] ABSTRACT

A "smart" memory card architecture and interface provides significantly increased performance, in part, by using fast access dynamic random access memory (DRAM) technologies which allows up to 8-byte data transfers from the memory card every 27ns after the initial access. The 27ns transfer rate includes the time required for error correction code (ECC), parity generation, and other reliability functions. Only two complementary metal oxide seminconductor (CMOS) integrated circuit (IC) logic chips or modules provide all the function required. The simplicity and flexibility afforded by the "smart" memory card approach provides a means to allow one card interface to be used with a broad range of hardware technologies and in different systems. The architecture of the memory card provides a full range of direct and partial store operations in a manner transparent to the system.

11 Claims, 21 Drawing Sheets

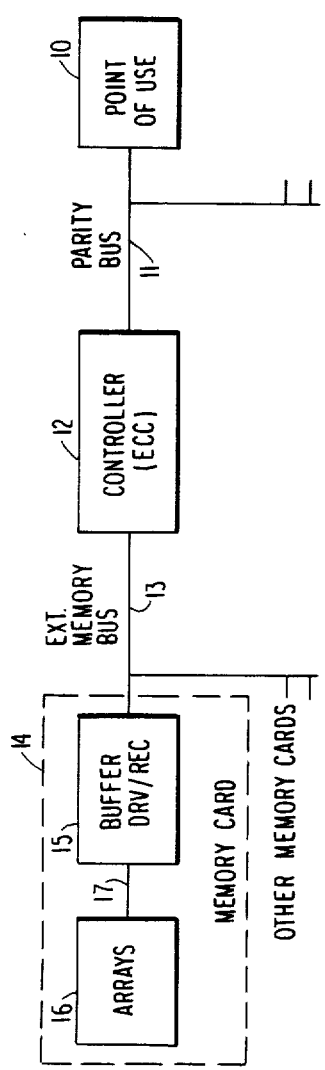
FIG. IA
PRIOR ART
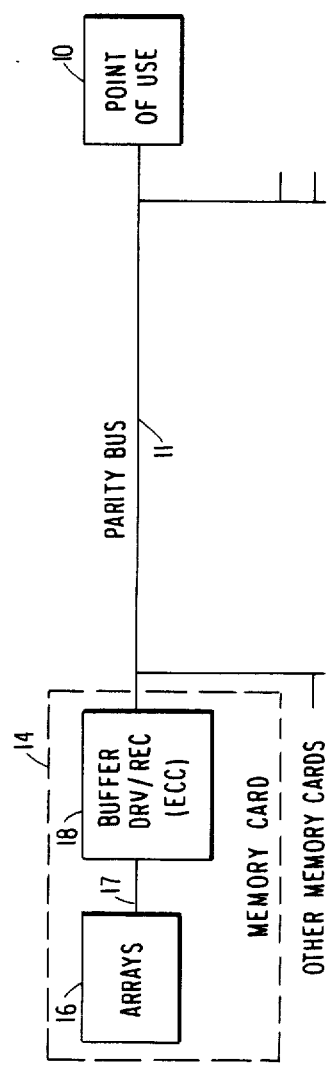
FIG. IB
PRIOR ART

FIG.12

| HEX | XFR | COMMAND | 01 0123 4567 |
|---|---|---|---|
| 2XX | 1-8 | STORE (1-64B OR 1-128B PER PORT) | 10 XXXX XXXX |
| 3XX | 1-8 | FETCH (1-64B OR 1-128B PER PORT) | 11 XXXX XXXX |
| 060 | 2 | DIAGNOSTIC STORE<br>STORE CB, RB, AND SPECIAL FUNCTION REGS &<br>STORE REDUNDANT BIT ADDRESS REGISTERS | 00 0110 0000 |
| 090 | 0 | RESET XECC COUNTER | 00 1001 0000 |
| 0D0 | 2 | STORE MASK & PROGRAM REGISTERS | 00 1101 0000 |
| 0A0 | 0 | RESET CHECKER REGISTER | 00 1010 0000 |
| 160 | 4 | DIAGNOSTIC FETCH:<br>FETCH CB, RB AND SPECIAL FUNCTION REGS &<br>FETCH REDUNDANT BIT ADDRESS REGISTERS &<br>FETCH STATUS DATA (SYN/XECC CNT/MISC) &<br>FETCH PROGRAM REGISTERS | 01 0110 0000 |
| 1D0 | 4 | FETCH MASK & CHECKER REGISTERS | 01 1101 0000 |

XFR : NUMBER OF SYSTEM TRANSFERS FOR COMMAND
 CB/RC ON NC 1-8 TRANSFERS (FETCH OR STORE)
 DATA LOOP  8 TRANSFERS

---

HEX CODE INTERPRETATION

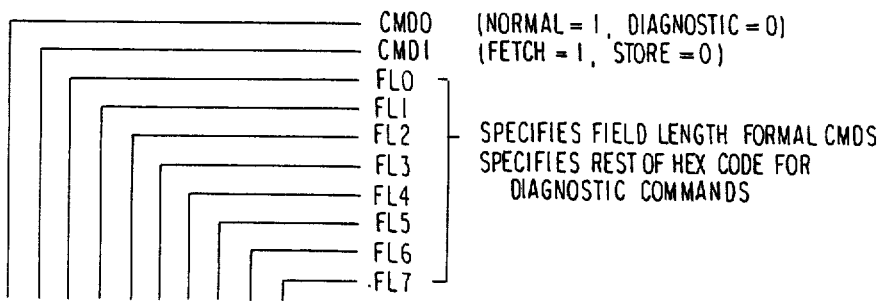

CMD0 (NORMAL = 1, DIAGNOSTIC = 0)
CMD1 (FETCH = 1, STORE = 0)
FL0
FL1
FL2  SPECIFIES FIELD LENGTH FORMAL CMDS
FL3  SPECIFIES REST OF HEX CODE FOR
FL4    DIAGNOSTIC COMMANDS
FL5
FL6
FL7

EXAMPLES:
 0 0 0 1 1 0 0 0 0    HEX 060 - DIAGNOSTIC STORE
 1 0 0 X X X X X X    HEX 2XX - NORMAL STORE

```
ONE TRANSFER (HE)
SB   SB   SB   SB   SB   SB   SB   SB
000  016  032  048  064  080  096  112
001  017  033  049  065  081  097  113
002  018  034  050  066  082  098  114
003  019  035  051  067  083  099  115
004  020  036  052  068  084  100  116
005  021  037  053  069  085  101  117
006  022  038  054  070  086  102  118
007  023  039  055  071  087  103  119
008  024  040  056  072  088  104  120
009  025  041  057  073  089  105  121
010  026  042  058  074  090  106  122
011  027  043  059  075  091  107  123
012  028  044  060  076  092  108  124
013  029  045  061  077  093  109  125
014  030  046  062  078  094  110  126
015  031  047  063  079  095  111  127
```

\* = DIRECT STORE
· = RMW
w = DIRECT STORE W/WRAP WITHIN BOUNDARY

```
TWO TRANSFER (HE)
SB   SB   SB   SB   SB   SB   SB   SB
000  016  032  048  064  080  096   -
001  017  033  049  065  081  097   -
002  018  034  050  066  082  098   -
003  019  035  051  067  083  099   -
004  020  036  052  068  084  100   -
005  021  037  053  069  085  101   -
006  022  038  054  070  086  102   -
007  023  039  055  071  087  103   -
008  024  040  056  072  088  104   -
009  025  041  057  073  089  105   -
010  026  042  058  074  090  106   -
011  027  043  059  075  091  107   -
012  028  044  060  076  092  108   -
013  029  045  061  077  093  109   -
014  030  046  062  078  094  110   -
015  031  047  063  079  095  111   -
```

```
THREE TRANSFER (HE)
SB   SB   SB   SB   SB   SB   SB  SB
000  016  032  048  064  080   -   -
001  017  033  049  065  081   -   -
002  018  034  050  066  082   -   -
003  019  035  051  067  083   -   -
004  020  036  052  068  084   -   -
005  021  037  053  069  085   -   -
006  022  038  054  070  086   -   -
007  023  039  055  071  087   -   -
008  024  040  056  072  088   -   -
009  025  041  057  073  089   -   -
010  026  042  058  074  090   -   -
011  027  043  059  075  091   -   -
012  028  044  060  076  092   -   -
013  029  045  061  077  093   -   -
014  030  046  062  078  094   -   -
015  031  047  063  079  095   -   -
```

```
FOUR TRANSFER (HE)
SB   SB   SB   SB   SB  SB  SB  SB
000  016  032  048  064  -   -   -
001  017  033  049  065  -   -   -
002  018  034  050  066  -   -   -
003  019  035  051  067  -   -   -
004  020  036  052  068  -   -   -
005  021  037  053  069  -   -   -
006  022  038  054  070  -   -   -
007  023  039  055  071  -   -   -
008  024  040  056  072  -   -   -
009  025  041  057  073  -   -   -
010  026  042  058  074  -   -   -
011  027  043  059  075  -   -   -
012  028  044  060  076  -   -   -
013  029  045  061  077  -   -   -
014  030  046  062  078  -   -   -
015  031  047  063  079  -   -   -
```

```
          FIVE TRANSFER (HE)
   SB   SB   SB   SB   SB  SB  SB  SB
   000  016  032  048   -   -   -   -
   001  017  033  049   -   -   -   -
   002  018  034  050   -   -   -   -
   003  019  035  051   -   -   -   -
   004  020  036  052   -   -   -   -
   005  021  037  053   -   -   -   -
   006  022  038  054   -   -   -   -
   007  023  039  055   -   -   -   -
   008  024  040  056   -   -   -   -
   009  025  041  057   -   -   -   -
   010  026  042  058   -   -   -   -
   011  027  043  059   -   -   -   -
   012  028  044  060   -   -   -   -
   013  029  045  061   -   -   -   -
   014  030  046  062   -   -   -   -
   015  031  047  063   -   -   -   -
```

```
          SIX TRANSFER (HE)
   SB   SB   SB  SB  SB  SB  SB  SB
   000  016  032  -   -   -   -   -
   001  017  033  -   -   -   -   -
   002  018  034  -   -   -   -   -
   003  019  035  -   -   -   -   -
   004  020  036  -   -   -   -   -
   005  021  037  -   -   -   -   -
   006  022  038  -   -   -   -   -
   007  023  039  -   -   -   -   -
   008  024  040  -   -   -   -   -
   009  025  041  -   -   -   -   -
   010  026  042  -   -   -   -   -
   011  027  043  -   -   -   -   -
   012  028  044  -   -   -   -   -
   013  029  045  -   -   -   -   -
   014  030  046  -   -   -   -   -
   015  031  047  -   -   -   -   -
```

```
SEVEN TRANSFER (HE)
SB   SB  SB  SB  SB  SB  SB  SB
000  016  -   -   -   -   -   -
001  017  -   -   -   -   -   -
002  018  -   -   -   -   -   -
003  019  -   -   -   -   -   -
004  020  -   -   -   -   -   -
005  021  -   -   -   -   -   -
006  022  -   -   -   -   -   -
007  023  -   -   -   -   -   -
008  024  -   -   -   -   -   -
009  025  -   -   -   -   -   -
010  026  -   -   -   -   -   -
011  027  -   -   -   -   -   -
012  028  -   -   -   -   -   -
013  029  -   -   -   -   -   -
014  030  -   -   -   -   -   -
015  031  -   -   -   -   -   -
```

```
EIGHT TRANSFER (HE)
SB   SB   SB   SB   SB   SB   SB   SB
 -   016  032  048  064  080  096  112
000  -    -    -    -    -    -    -
001  -    -    -    -    -    -    -
002  -    -    -    -    -    -    -
003  -    -    -    -    -    -    -
004  -    -    -    -    -    -    -
005  -    -    -    -    -    -    -
006  -    -    -    -    -    -    -
007  -    -    -    -    -    -    -
008  -    -    -    -    -    -    -
009  -    -    -    -    -    -    -
010  -    -    -    -    -    -    -
011  -    -    -    -    -    -    -
012  -    -    -    -    -    -    -
013  -    -    -    -    -    -    -
014  -    -    -    -    -    -    -
015  -    -    -    -    -    -    -
```

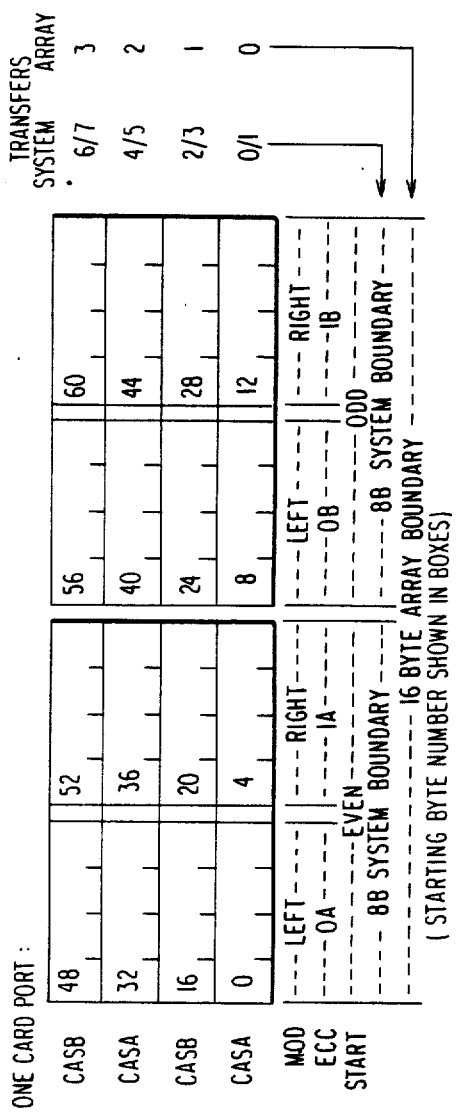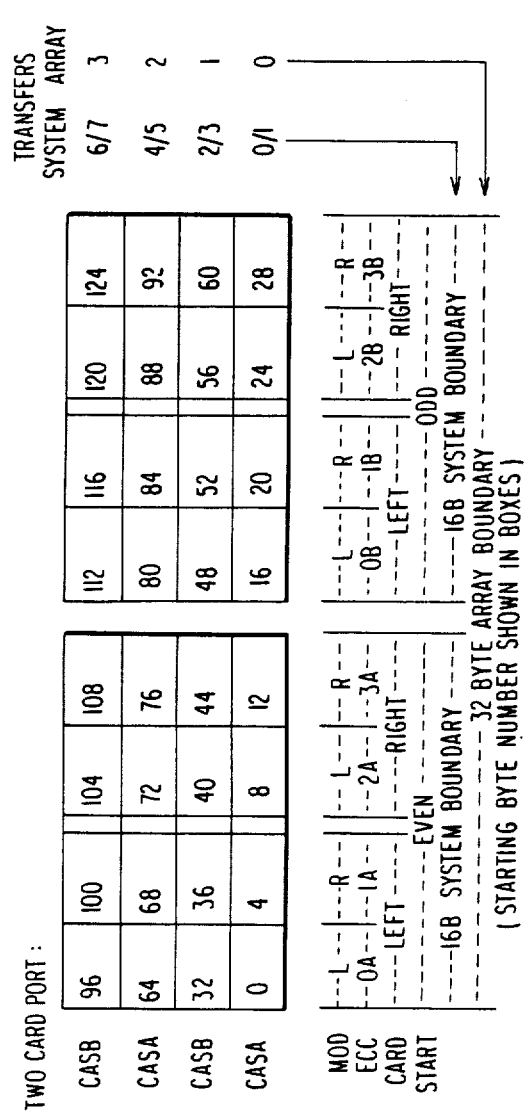
FIG.14A
FIG.14B

FIG. 15

GROUP 1 TRANSFERS (PW CASES)

| ARRAY | SYSTEM COMBINATIONS | | | | |
|---|---|---|---|---|---|
| P/W | PW/WW | P/WW | PW/W | P/W |
| P/W/W | PW/WW/WW | P/WW/WW | PW/WW/W | P/WW/W |
| P/W/W/W | PW/WW/WW/WW | P/WW/WW/WW | PW/WW/WW/W | P/WW/WW/W |

GROUP 2 TRANSFERS (WP CASES)

| ARRAY | SYSTEM COMBINATIONS | | | | |
|---|---|---|---|---|---|
| W/P | WW/WP | W/WP | WW/P | W/P |
| W/W/P | WW/WW/WP | W/WW/WP | WW/WW/P | W/WW/P |
| W/W/W/P | WW/WW/WW/WP | W/WW/WW/WP | WW/WW/WW/P | W/WW/WW/P |

GROUP 3 TRANSFERS (PP CASES)

| ARRAY | SYSTEM COMBINATIONS | | | | |
|---|---|---|---|---|---|
| P | P | PP | | |
| P/P | PW/WP | P/WP | PW/P | P/P |
| P/W/P | PW/WW/WP | P/WW/WP | PW/WW/P | P/WW/P |
| P/W/W/P | PW/WW/WW/WP | P/WW/WW/WP | PW/WW/WW/P | P/WW/WW/P |

P = TRANSFER WHERE PREFETCH MUST BE DONE WITH ASSOCIATED STORE.
   (P's ON SYSTEM TRANSFER REQUIRES PREFETCH ACROSS ENTIRE PORT)
W = NO PREFETCH NEEDED BASED ON THIS TRANSFER
/ = ARRAY BOUNDARY

FIG. 18

```
             FREQ     ROW  ADDR
REFRESH    ┌─┬─┬─┬─┬─┬─┬─┬─┬─┬─┬─┬─┬─┐
COUNTER    │C│B│A│9│8│7│6│5│4│3│2│1│0│           SFR BITS
  msb      └─┴─┴─┴─┴─┴─┴─┴─┴─┴─┴─┴─┴─┘ lsb        q   r
               NEVER              <- COMPARISON BITS   0   0
                     C C C C C C C C  <- COMPARISON BITS   0   1
               C C C  C C C C C C C C <- COMPARISON BITS   1   0
               CONTINUOUS         <- COMPARISON BITS   1   1

SCRUB      ┌─┬─┬─┬─┬─┬─┬─┬─┬─┬─┬─┬─┬─┬─┬─┬─┬─┬─┬─┬─┬─┬─┐
COUNTER    │C│B│A│*│8│7│6│5│4│3│2│1│8│7│6│5│4│3│2│1│0│
  msb      └─┴─┴─┴─┴─┴─┴─┴─┴─┴─┴─┴─┴─┴─┴─┴─┴─┴─┴─┴─┴─┘ lsb
              FREQ       ROW  ADDR      COLUMN  ADDR
```

A, B, * = VARIOUS CARD ADDRESSES BASED ON CARD SIZE

FIG. 20

| CARD TYPE | SFR q | BITS r | TIME TAKEN TO SCRUB ENTIRE CARD |
|---|---|---|---|
| 8MB | 0 | 1 | 0.3 hr |
|  | 1 | 0 | 2.0 hr |
| 16MB | 0 | 1 | 0.6 hr |
|  | 1 | 0 | 4.0 hr |
| 32MB | 0 | 1 | 1.2 hr |
|  | 1 | 0 | 8.0 hr |
| 64MB | 0 | 1 | 2.4 hr |
|  | 1 | 0 | 16.0 hr |
| 8MB | 1 | 1 | 2 sec |
| 16MB | 1 | 1 | 4 sec |
| 32MB | 1 | 1 | 8 sec |
| 64MB | 1 | 1 | 16 sec |

EXAMPLES OF AVAILABILITY IMPACT ON ONE CARD :

| SFR q | BITS r | BASE REFRESH AVAILABILITY | AVAILABILITY HIT ADDER | NET AVAILABILITY |
|---|---|---|---|---|
| 0 | 1 | 97.4 % | 0.010 % | 97.4 % |
| 1 | 0 | 97.4 % | 0.001 % | 97.4 % |
| 1 | 1 | 97.4 % | 6.000 % | 91.4 % |

SMART MEMORY CARD ARCHITECTURE AND INTERFACE

BACKGROUND OF THE INVENTION

1. Field of the Invention

The present invention generally relates to a computer memory interface and architecture and, more particularly, to a simple yet powerful and flexible memory interface and architecture for a memory card which can be used in different system configurations, with different array types, and different memory sizes. The invention contemplates a "smart" memory card having improved performance and function including fast access without sacrifice of reliability enhancement functions and a full range of direct and partial store operations in a manner transparent to the system.

2. Description of the Prior Art

The basic architecture of a typical computer system includes a central processor unit (CPU) connected by a bus to a random access memory (RAM) Devices other than the central processor, such as input/output (I/O) devices, access the RAM for the purpose of reading and writing data. Early computer systems required these devices to raise an interrupt level to request the CPU to allow access to the RAM. This caused delays in processing time by the computer system, and therefore direct memory access (DMA) controllers were developed to allow access to RAM without interrupting the CPU.

These computer systems, whether micros, minis or mainframes, are generally characterized by a modular construction wherein the RAM is composed of a plurality of memory printed circuit cards which plug into the bus. These memory cards typically comprise an array of integrated circuit (IC) chips and little else, all the control being exercised off the card by the CPU and/or DMA controller. Such cards for the purposes of this disclosure may be referred to as "non-intelligent" memory cards The subject invention belongs to a class of memory cards which are referred to herein as "intelligent" memory cards; that is, these memory cards include various data flow and control logic which perform functions that are performed off the card in non-intelligent memory cards.

In order to put the invention in context, reference is first made to FIG. 1A which shows in high level block diagram form the prior art non-intelligent memory card and processor interface. In this system, the processor 10 communicates via a parity bus 11 to a memory controller 12 that includes error correction code (ECC) functions. The controller in turn communicates via an external memory bus 13 with a plurality of memory cards, only one of which is shown at reference numeral 14. Each of these memory cards includes drivers and receivers 15, which provide buffering between the external memory bus 13 and the internal memory bus 17. The internal memory bus is used to address the arrays 16 of random access memory (RAM) chips on the card.

The architecture of an intelligent memory card is shown by way of contrast in FIG. 1B, wherein like reference numerals indicate the same or corresponding circuits. It will be noted that the controller 12 and the external memory bus 13 have been eliminated. The functions of the controller have been incorporated into the buffer logic 18. As will be described in more detail, incorporation of these functions into the on-card circuits provides a significant enhancement to machine performance and is the basis for characterizing the memory card as an intelligent or a "smart" memory card.

The subject invention is specifically an improvement on the memory architecture and processor interface used in the IBM 9370 series computers. These memory cards belong to the class of intelligent memory cards. FIG. 2 is a high level block diagram of the IBM 9370 series of smart memory cards. These cards comprise a memory array 21 composed of eighty 512K×2 arrays of dynamic random access memory (DRAM) chips configured in two banks of forty. This particular memory card has an 8-byte wide internal memory data bus 27 and 28 which interconnects the on-card logic 23 to the two memory array banks 21 and two 2-byte wide external memory buses 24 and 25. Uni-directional control buses 22a, 22b and 22c respectively connect array control redrive logic 26a, 26b and 26c to the memory arrays. These buses supply the array addresses, array selects (RAS and CAS), read/write control, and data input/output controls. A central controller 29 is divided into two parts, an array control communicating with the array control redrive logic 26a, 26b and 26c and a data flow control communicating with bidirectional data flow logic 30 and 31. The bidirectional data flow logic 30 and 31 each include two 4-byte ECC halves.

The use of a "smart" memory card eliminates the need for an extra bus between the memory arrays and the point of use of the array data, thus eliminating the associated bus delay on this performance critical path. Normally, the bus for I/O and cache is a parity bus such that the ECC logic does not have to be replicated on each cache and I/O interface. A controller with ECC logic connects this parity bus to one or more memory cards without ECC on them. However, logic on the memory cards would still have to buffer data between the array and off-card memory bus. By including the ECC in the memory card buffer logic, the memory card is permitted to sit directly on the parity bus, thus permitting faster memory access. In a synchronous environment, this provides at least one clock savings on each fetch or store transfer by eliminating one or more latch states.

As on card logic for ECC enhances performance by eliminating some bus delay, self contained logic for operations like extended ECC, soft fail scrubbing, and read-modify-write (RMW) enhance performance by reducing cycle times for these operations. Cycle times are reduced since there is no need for multiple off-card bus crossings during these operations. The automatic nature of these operations eliminates system control overhead and the associated time that would be required. One example is extended ECC (XECC). The system only initiates one or a series of array fetches. If extended ECC needs to be performed, then the memory card holds the BUSY line active while XECC occurs internally. This consists of an inversion of the initially fetched data containing the detectable but uncorrectable (by ECC alone) errors, a store back to the same memory location, another data fetch to that location and a subsequent inversion of that data before processing by the ECC logic. If the XECC operation is successful, the corrected data is restored to that memory location. If unsuccessful, the initial data with the detectable error is restored. The successful XECC operations are then followed by any remaining subsequent fetch transfer(s) to the system bus. Bus crossing delays for these three internal operations would increase the net cycle time for the operation if they were done externally.

Another example is read-modify-write (RMW) A read-write-modify operation is a partial store, partial in that one or more of the 4-byte ECC words will only have one or more, but not all, of its bytes overwritten. To ensure that the ECC word(s) have correct data and correct associated check bits, the data stored in memory that is to be partially overwritten must first be fetched from memory, referred to as a prefetch, and run through the ECC to correct any single bit errors. Multiple bit errors could invoke the XECC operation. The system sends a store command with associated field length and starting address, and the memory card determines if a direct write or RMW is required. If a RMW is required, then for certain cases, the card stores all system transfers in a buffer while initiating a prefetch to memory. Thus, the system store and card prefetch run concurrently. Once the prefetch occurs and memory errors are corrected, the card overwrites the appropriate prefetched bytes and stores the result back to memory. Again, operation cycles and system logic overhead is minimized.

Card memory refresh and associated soft error scrubbing are also somewhat transparent to the system. For normal refresh operations, the system activates he refresh line and waits for BUSY to go away. The memory card handles the refresh address count and the array controls If active and triggered, soft error scrubbing occurs at active refresh time by replacing the appropriate refreshes. The scrub operations are basically a zero byte RMW. Data is fetched from memory, on-card ECC corrects any single bit errors, and then data is restored to memory. If the single bit error was related to a soft fail, then the restore puts good data in place of the bad data bit that was the soft fail. Refresh is also accomplished during this operation.

The IBM 9370 processor has evolved to incorporate high performance functions and this, in turn, required an improved design for the memory cards for the next generation system. The improved design and function are the basis for this application. The next generation design objective included the ability to obtain up to eight 8-byte data transfers from the memory card every 27 ns after the initial access. This 27 ns transfer rate had to include the time required for Error Correction Code (ECC), parity generation, and other reliability enhancement functions.

In the process of designing the new memory card, it was another design objective to pack all the function required into a minimum number of integrated circuits (ICs). The problem here was to provide all the needed function and still stay within the chip/module I/O limitations set by cost constraints and the capabilities of current technology.

A third design objective was to define an interface and architecture that is both simple and highly flexible, allowing the memory card to be used with a broad range of hardware technologies and system uses.

SUMMARY OF THE INVENTION

It is therefore an object of the present invention to provide an improved "smart" memory card which is capable of up to eight 8-byte transfers from the memory card after the initial access.

It is another object of the invention to provide a full function memory card interface and architecture with minimum chip count limitations set by cost constraints and technology capabilities.

It is a further object of the invention to provide an interface and architecture for a computer memory card which is very simple to operate from a systems standpoint for a broad range of hardware technologies and system uses.

It is yet another object of the invention to provide a memory card architecture which greatly increases partial store flexibility while simplifying the control needed for the memory card interface.

According to the preferred embodiment of the invention as implemented in next generation of the IBM 9370 processor environment, the "smart" memory card architecture and interface provides significantly increased performance, in part, by using 80 ns fast access dynamic random access memory (DRAM) technologies which allows up to 8-byte data transfers from the memory card every 27 ns after the initial access. The 27 ns transfer rate includes the time required for error correction code (ECC), parity generation, and other reliability functions. Only two complementary metal oxide semiconductor (CMOS) integrated circuit (IC) logic chips or modules provide all the function required and yet stay within the chip/module input/output (I/O) limitations set by cost constraints and technology capabilities. The simplicity and flexibility afforded by the "smart" memory card approach provides a means to allow one card interface to be used with a broad range of hardware technologies and in different systems. The architecture of the memory card provides a full range of direct and partial store operations in a manner transparent to the system.

BRIEF DESCRIPTION OF THE DRAWINGS

The foregoing and other objects, aspects and advantages of the invention will be better understood from the following detailed description of a preferred embodiment of the invention with reference to the drawings, in which:

FIGS. 1A and 1B are block diagrams illustrating, respectively, a prior art non-intelligent memory card and a smart memory card;

FIG. 12 is a command listing and relation diagram for the multi-use bus shown in FIG. 11;

FIGS. 14A and 14B are functional block diagrams illustrating RMW data boundary definitions for a one card port and a two card port, respectively;

FIG. 15 is a table showing the RMW combinations of the memory card according to the invention;

FIG. 18 is a diagram of the scrub/refresh counter;

FIG. 20 is a table showing examples of implemented scrub rate numbers.

DETAILED DESCRIPTION OF A PREFERRED EMBODIMENT OF THE INVENTION

Figure 3:
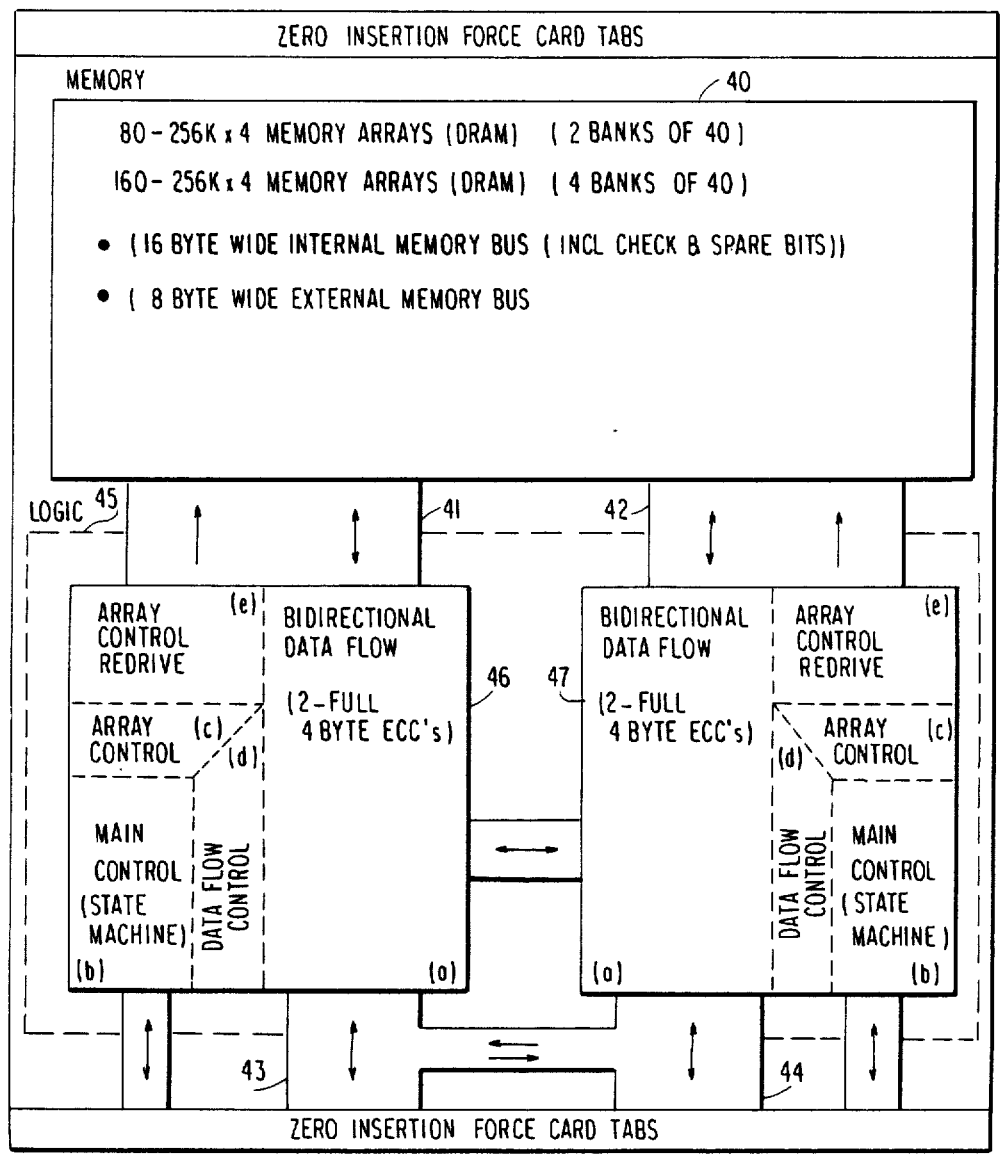
FIG. 3 is a block diagram showing the overall architecture of a preferred embodiment of the smart memory card according to the invention.

Referring now to the drawings, and more particularly to FIG. 3, there is shown a high level block diagram of the smart memory card according to the invention. The card illustrated comprises a memory 40 composed of eighty 256K×4 DRAMs in two banks of forty or 160 256K×4 DRAMs in four banks of forty. There is a 16-byte wide internal memory bus 41, 42 and an 8-byte wide external memory bus 43, 44. The internal memory bus 41, 42 provides a communication path, for data and control, between the memory 40 and the logic 45 which is composed of two CMOS chips 46 and 47 especially designed to support the performance and functions of the new memory card. Broadly described, each of the CMOS chips 46 and 47 is divided into five functional parts. The first part (a) supports bidirectional data flow between the system bus and the memory 40 and includes two full 4-byte ECCs. The second part (b) is the main control which is implemented as a state machine. The third part (c) provides the array control functions. The fourth part (d) provides data flow control. The fifth part (e) is the array control redrive. The design and operations performed by the several parts of these CMOS chips is described in more detail hereinafter.

Figure 2:
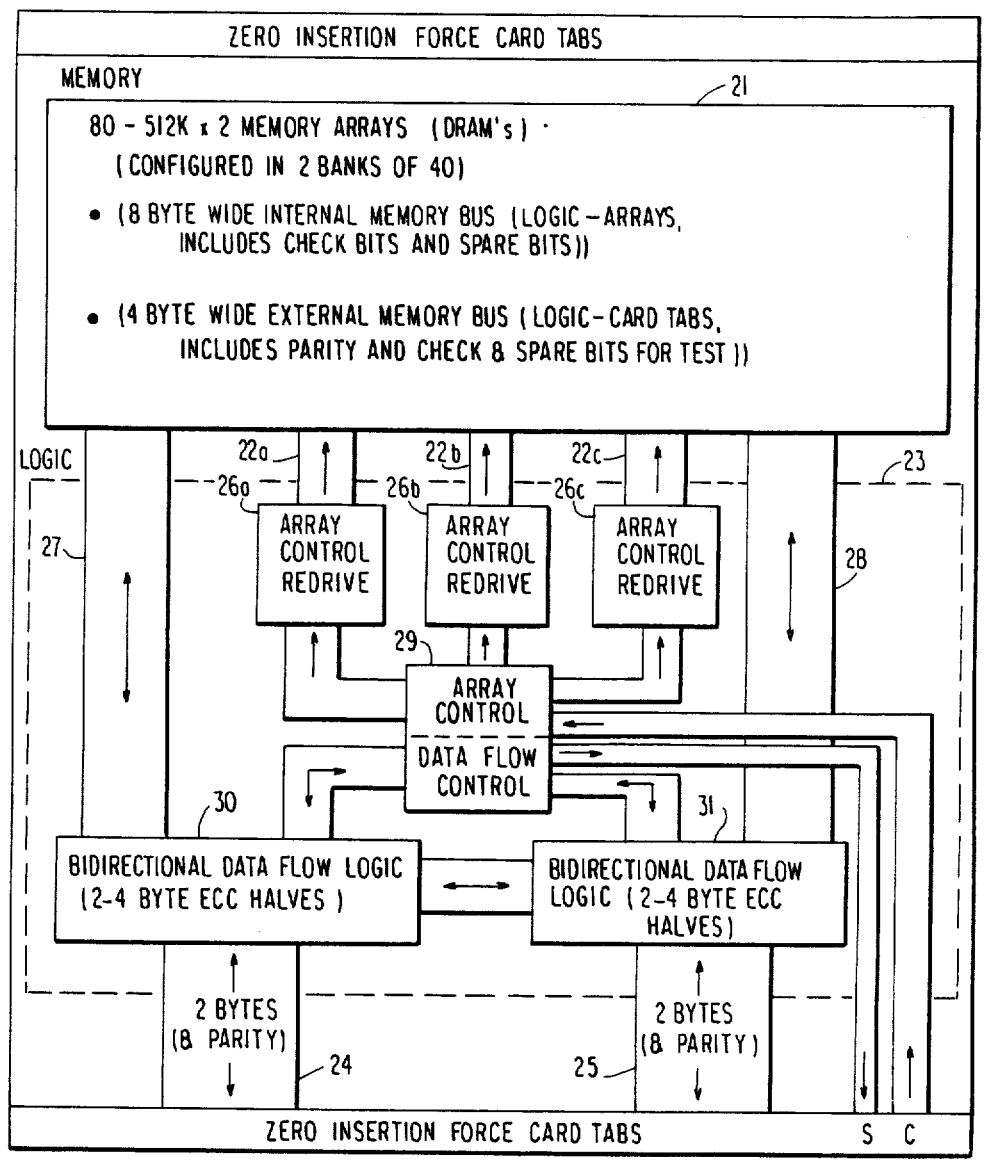
FIG. 2 is a block diagram showing the overall architecture of a prior art smart memory card.

Although the interface data bus for the prior memory card shown in FIG. 2 minimized the number of dedicated I/O needed, the number of I/O for the width of the bus itself became an important design factor. A wide off-card data bus provides key performance advantages to the processor. As this bus grows wider and wider, the number of card I/Os must grow. Since the logic must at least buffer signals sent between cards, the number of associated chip/module I/Os must also grow. As the number of chip I/O increases, the amount of chip area to support these I/O increases, thus providing the silicon for the required buffer circuits and all the added logic that makes up the "smart" card architecture. In effect, the on-card ECC and other reliability enhancement functions are almost free.

The on-card division of this I/O and associated function can be accomplished in one of two ways; either many small, low cost modules, or one or two larger and more expensive modules. There were key advantages to be found through the use of only one or two modules as shown in FIG. 3. Thus, a two module approach was chosen for the subject invention, and the card architecture had to be developed to make use of these advantages.

The card was architected in such a way that the 16-byte interface 41, 42 to the arrays 40, the 8-byte interface 43, 44 to the system, and the associated on-card logic could be symmetrically cut in half. This allowed one module part number to be used twice on the card. This significantly reduced design development and the stocking overhead associated with an added card part number. Although the logic is similar, the two logic modules must function differently. This is handled by a dedicated module line that is grounded or tied high to personalize the logic. With four ECCs on the card, it is not difficult to partition the logic function across two or four modules. By keeping the number of modules under four, communication lines between the modules is held at six. When ECC sections have to be split across module boundaries, as with the main store for the IBM 9370 processor, then the cross chip signals significantly increase.

To limit the number of modules to two, the array control logic was pulled in with the data flow logic. As seen in FIG. 2, the IBM 9370 main store has two data flow modules 30 and 31, three array control redrive modules 26a, 26b and 26c, and one main control module 29. By pulling this logic within one module, critically timed array control signals (like RAS, CAS and address) can be made to come from only one logic chip. This reduces timing skews and increases timing margins thus resulting in a net card performance improvement. The skew reduction results from the tracking associated with path, process, and environment for internal logic and drivers, which is inherent on a single chip. Limiting the number of modules per card results in a reduction in the overall number of logic module pins, both power and signal. This reduction accounts for a slight card reliability improvement and can lend itself to better card real estate use and card wiring.

Although one module would have been the optimal approach, no package technology was available to handle the total number of I/O and the associated simultaneous switching requirements. The final choice of two instead of four was made to avoid a key technical problem related to the off-card data interleaving discussed below. The avoidance of this problem had much to do with the selected architecture. If four logic modules were to be used, then functional partitioning would require that one ECC be assigned to each module. In this case, data interleave to get from 16-bytes at the array to 8-bytes at the system, would require that one ECC module's I/O be physically dotted with another at the system interface. The same would occur for the remaining two ECCs. Driver high impedance control for this dotted interface is very difficult to do properly. The interleave between modules has to be tightly timed to meet bus performance, yet avoid bus contention problems that could damage the drivers. The heavy loading of the bus and internal logic skews could make these critical timings impossible to meet. The subject invention avoids this by putting associated pairs of ECCs on one module and "dotting" their outputs internally via the data output select multiplexers (59 in FIG. 4). The following description relates this action to a memory data fetch operation and ties in the other basic architectural components that are also shown in FIG. 4.

Figure 4:
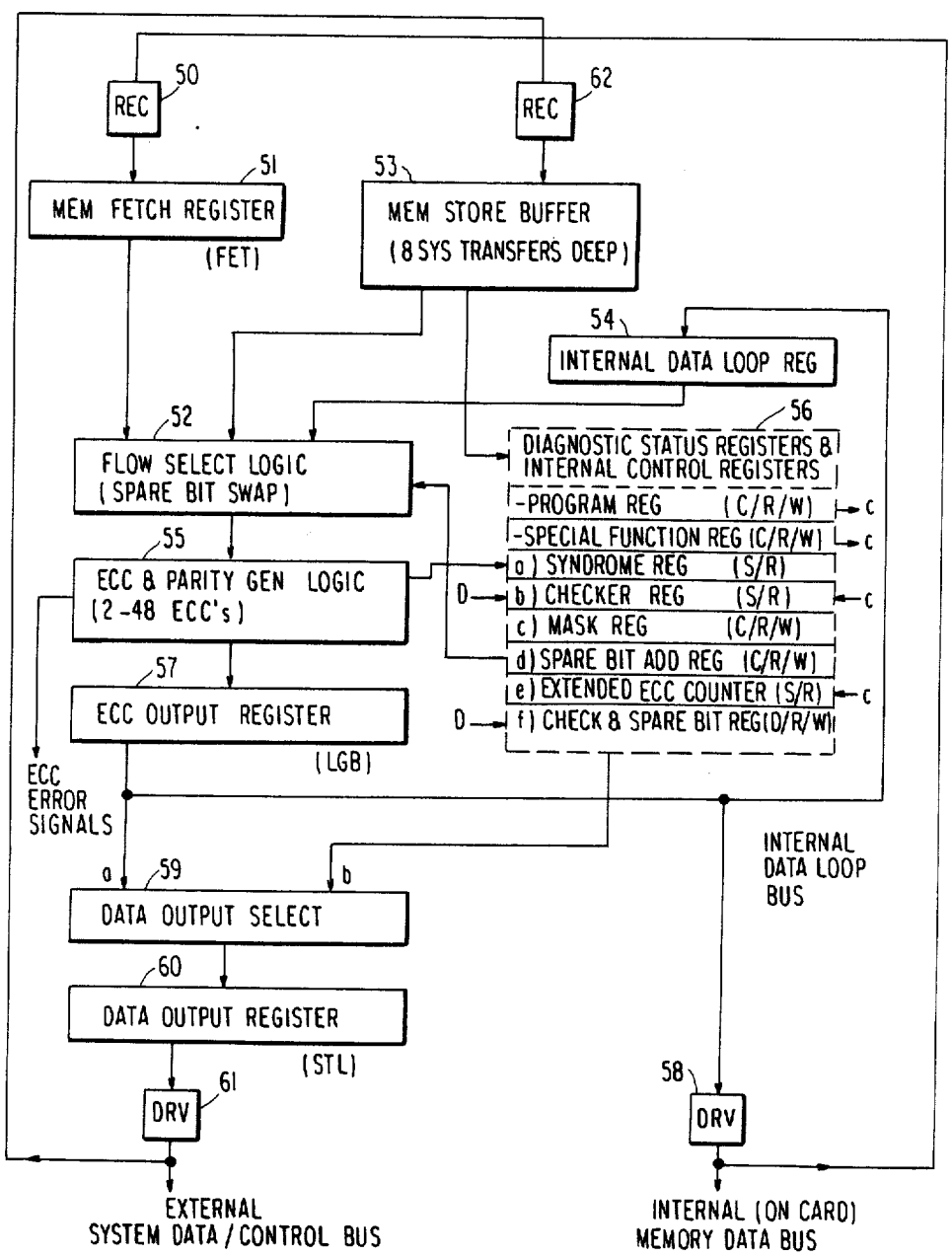
FIG. 4 is a block diagram illustrating the data flow architecture, of the smart memory card according to the invention.
Figure 5:
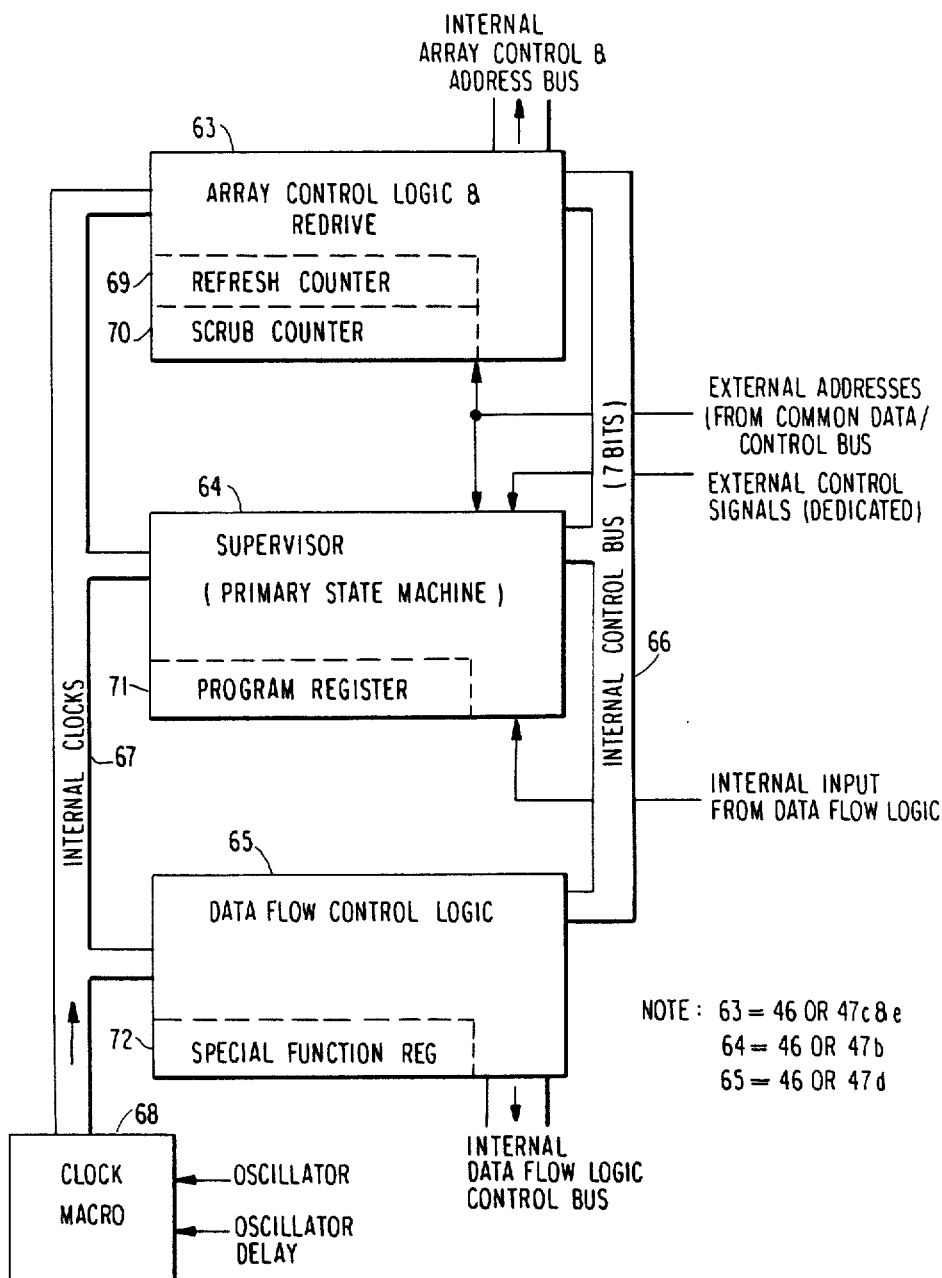
FIG. 5 is a block diagram showing the control logic of the smart memory card according to the invention.

Referring now to FIGS. 4 and 5, there are shown in block diagram form the data flow architecture and control logic of the smart memory card according to the present invention. A fetch command is sent to the card and is interpreted by the supervisor control logic (64 in FIG. 5). This logic directs the array control logic (63 in FIG. 5) via the internal control bus (66 in FIG. 5) to properly activate the arrays for a fetch operation. A short time later, as related to the access time for the arrays, data is put out on the internal memory data bus and temporarily stored in memory fetch register 51. The flow select logic 52 selects the data in register 51 instead of data from the memory store buffer 53 or the internal data loop register 54. The output of flow select logic 52 is then supplied to ECC and parity generator logic 55 which supplies an output to the ECC output register 57.

Block 56 in FIG. 4 represents the internal registers that can be loaded or read by diagnostic commands. The letters in the parentheses provide some detail about the registers. A control register is indicated by a (c), a status register by a (s), and a data register by a (d). Letters (r) and (w) are used to respectively indicate if the register can be read and/or written to via the "multi-use data bus". Although the registers are all shown in the figure for data flow logic detail, some registers like the program register actually reside in the control logic (71 in FIG. 5), and some registers like the checker register are split between the data flow and control logic.

The double latch design, that is, a register 51 prior to the ECC 55 and a register 57 after the ECC, is critical to synchronous operation of the ECC logic and to pipelining data through the ECC to get a continuous data output. The parity generation and ECC logic are shown as a single block since some of the ECC encoding circuitry serves a double purpose by generating an uncorrected parity bit for each data byte. Parity correction, if needed, takes place in separate circuitry that follows the encoding logic. For a fetch operation, the ECC logic also generates and stores syndrome data in the syndrome status register in block 56. This syndrome is held for future diagnostic operations that may be done in conjunction with the fetch operation. The ECC logic 55 also generates any appropriate error signals. The fetched data that is temporarily stored in the ECC output register 57, which is 16 bytes wide (8 bytes per module), is then multiplexed out to the external system bus via the data output select logic 59, the data output register 60 and the bus driver 61. Multiplexing puts out 8 bytes, 4 bytes from one ECC, then 4 bytes from the other ECC each for each of the two modules, then 8 bytes from the other two ECCs. For performance optimization, the first 8 byte transfer is latched into the ECC output register 57 and the data output register 60 at the same time. This is described in more detail hereinafter with reference to FIG. 7. Due to data pipelining, the output of the ECC output register 57 is also sent via the internal data loop bus to the internal data loop register 54 and latched. This is done in anticipation of the possible activation of an Extended ECC operation. This register would hold the "bad" data for the subsequent invert and memory store back steps of the XECC operation.

The control logic architecture of the smart memory card according to the invention is shown in FIG. 5. This logic comprises three main components; an array control logic and redrive 63, a supervisor 64 and data flow control logic 65. Each of these components are interconnected by an internal control bus 66 and receive internal clock signals on line 67 from clock logic 68. The array control logic 63 includes a refresh counter 69 and a scrub counter 70 described in more detail in a later section with reference to FIG. 18. The supervisor 64 is the main state machine which drives the state machines that make up the array and data flow control logic 63 and 65. The included program register 71 is used to initialize/personalize the state machine for the appropriate card type and system application. The data flow control logic 65 includes a special function register (SFR) 72. The SFR is used primarily to personalize the data flow logic 65 for a variety of diagnostic and self test operations. The program register 71 and the SFR 72 are part of the diagnostic status registers and internal control registers 56 shown in FIG. 4.

Figure 6:
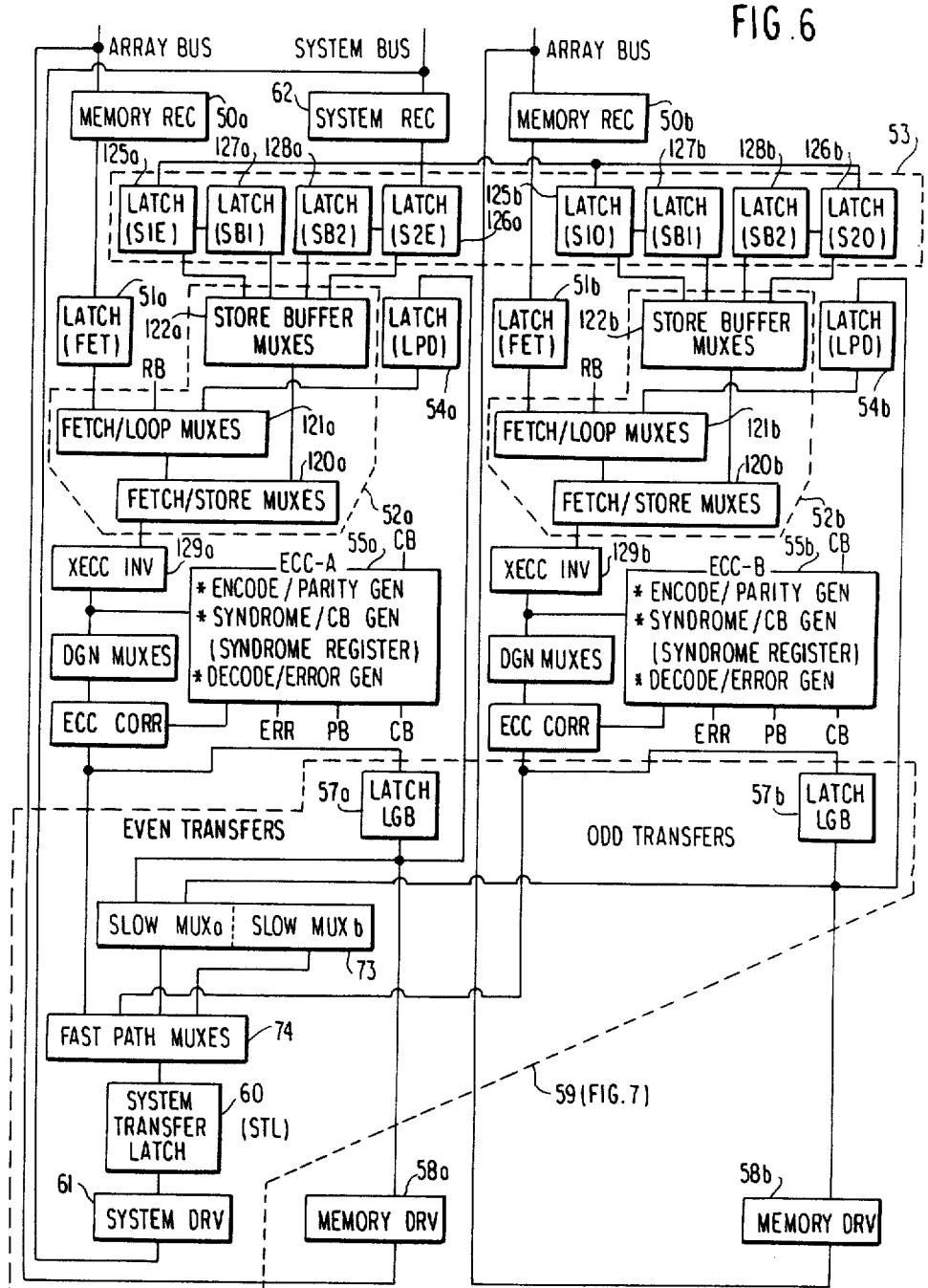
FIG. 6 is a block diagram showing in more detail the internal data flow design of the smart memory card according to the invention.

The data flow architecture for the memory card of FIG. 3 is shown in more detail in FIG. 6, wherein like reference numerals as used in FIG. 4 indicate the same or similar components. In FIG. 6, the suffix "a" or "b" added to a reference numeral indicate even and odd data transfer logic, respectively. To better show a key portion of the data flow, reference will be made to FIG. 7 which is a blown up view of the logic in the indicated dashed area of the data flow diagram of FIG. 6.

The first aspect to be described of the smart memory card according to the invention is performance. This topic addresses the key fetch and store transfer rate problem and its associated solutions. In addition, other unique architecture and interface techniques are described to improve the overall performance of the memory card.

In order to achieve a sustained data transfer rate as fast as 8-bytes per card every 27 ns as required by the new generation IBM 9370 series of computers, the memory card architecture employs two forms of interleaving on the card. The first form involves the page-mode operation that is an inherent part of most dynamic random access memory (DRAM) arrays currently in use. The second form is the on-card manipulation between the 16-byte internal array bus and the 8-byte external system bus. The "smart" memory card architecture according to the invention, in conjunction with the simple interface that is described below, allows for this interleaving and could be used for a wide variety of interleave schemes to meet different performance requirements.

Figure 8:
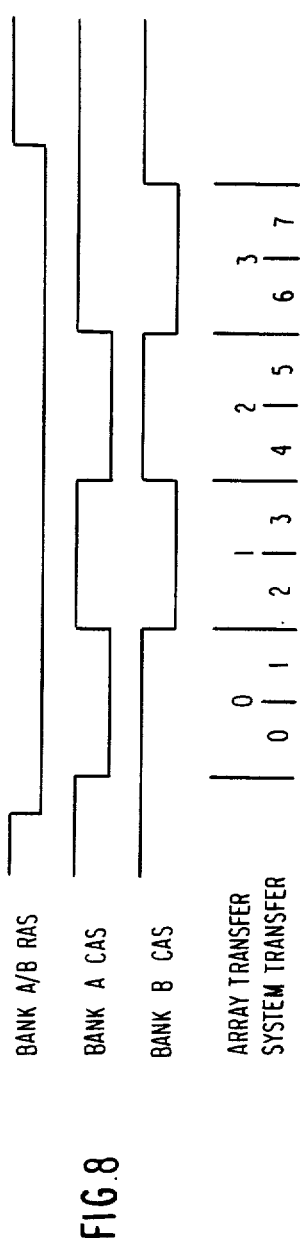
FIG. 8 is a timing diagram illustrating the dual interleave operation of the invention.

The timing diagram is shown in FIG. 8. Interleaving of array column address strobe (CAS) lines during an active array page-mode operation allows for faster transfers of data to and from memory than with back-to-back fetch or store operations. As an example, referring to FIG. 8, the array row address strobe (RAS) to all arrays in a pair of memory banks are activated (low) and held throughout a fetch page mode operation. Then the CAS to Bank A is activated to fetch 16 bytes from memory, followed by CAS activation to Bank B to fetch 16 more bytes, followed by 16 more bytes from Bank A again, and finally 16 bytes from Bank B. These four 16 byte array transfers are then pipelined through the ECC logic via the double 16 byte registers (51 and 57 in FIG. 4). The present invention is set up for only two page cycles per bank of arrays. However, a page mode operation can consist of many CAS activations during one RAS activation. Thus, the actual number of 16 byte array transfers for any multiple fetch operation can be increased significantly. To improve performance for vector processing, the number of page cycles per array bank could be increased. The page limits for arrays in use today would provide more than enough capability.

Each 16-byte array transfer to or from memory is then interleaved on or off of the card with even and odd system data transfers. The 16-byte to 8-byte multiplexing of data on a fetch is accomplished by the output multiplexer (MUX) circuits 73 and 74 FIG. 6. The 8-byte to 16-byte conversion on stores is accomplished by routing the received system data to both the even and odd sections of the store buffer 125a or 126a and 125b or 126b (in FIG. 6), respectively, and then only enabling the appropriate latch section for the corresponding system transfer.

Figure 7:
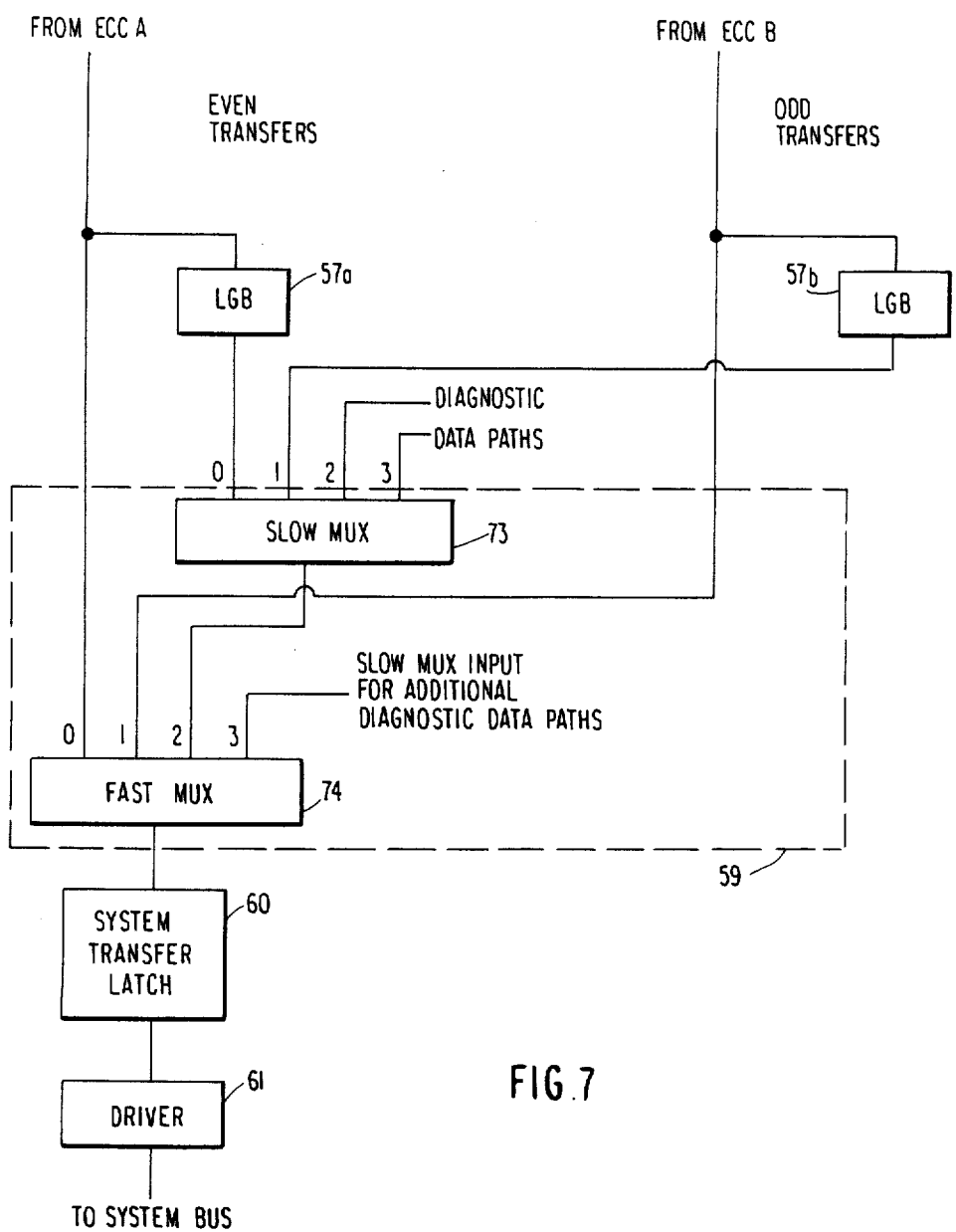
FIG. 7 is a portion of the block diagram of FIG. 6 showing in more detail the fetch data output select operation of the invention.

The 16-byte and 8-byte conversion on fetches is illustrated by the following description with reference to FIGS. 6 and 7. Even transfers from LGA latches 51a are supplied to ECC A 55a, while odd transfers from LGA latches 51b are supplied to ECC B 55b. The outputs of ECC A 55a and ECC B 55b are latched in LGB latches 57a and 57b, respectively, which provide outputs to a slow multiplexer (MUX) 73. The outputs of ECC A 55a and ECC B 55b are also supplied to a fast multiplexer (MUX) 74 along with the output of multiplexer 73. The output of the fast MUX 74 is supplied via system transfer latch 60 to drivers 61 which provide the interface to the system bus. The first 8-byte transfer of the fetch will always be routed via fast multiplexer path 0 or 1 and the second 8-byte transfer via fast multiplexer path 2. The first 8-byte transfer is latched in system transfer latch 60 at the same time as the associated 16-byte array transfer is latched in LGB latches 57.

Figure 9:
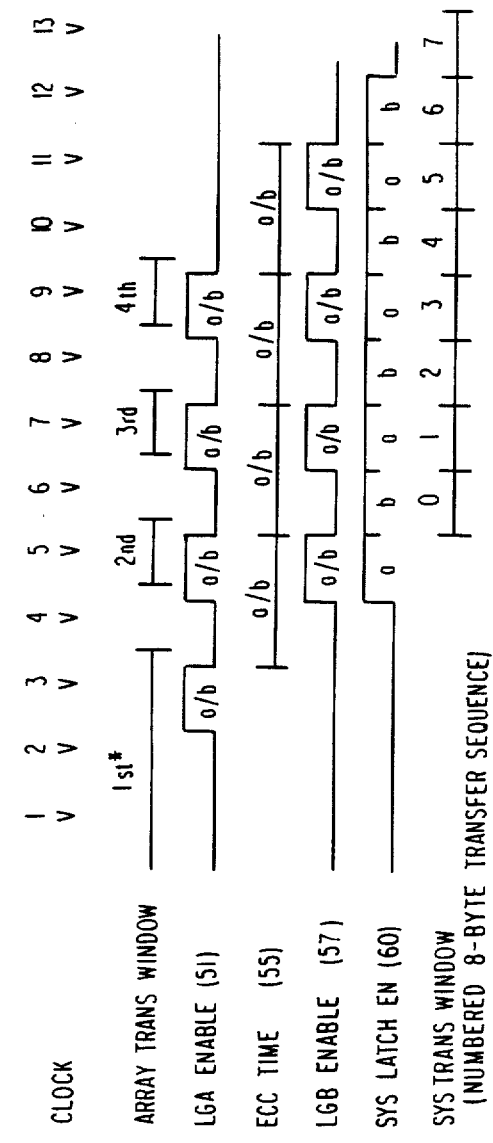
FIG. 9 is a timing diagram illustrating the fetch data output timing of the invention.

As shown in the following example, four consecutive 16 byte transfers are fetched from memory by interleaving CAS lines and then transferring this 64 bytes of data on to the system bus in eight 8-byte transfers. These two interleave actions allow the data to be pipelined through the error correction code (ECC) circuits 55a and 55b in such a fashion that all eight data transfers are contiguous and at the minimum system clock rate. The timing diagram for this is shown in FIG. 9. In FIG. 9, the numbers in parentheses indicate what register latches are enabled when the timing pulse is at a high level. The a/b indicates that both even (a) and odd (b) data (a full ≠bytes) are latched at the same time.

To meet the 27 ns transfer rate on fetch operations and allow for optimal data control flexibility, a unique output multiplexer and latch circuit had to be developed. This circuit had to satisfy two critical timing paths. One path is the internal latch 51 to latch 57 delay through the ECC fetch logic, and the other path being the latch 60 to system bus output. The 27 ns requirement for latch-to-latch delay across the system bus prevented any combinational logic from being placed between the system latches 60 and drivers 61. Thus, the multiplexer logic for the 16-byte array transfer to 8-byte system transfer interleave had to be put between the internal ECC latch groups. This created a problem with getting the first 8 bytes of each array transfer (either even or odd) through ECC circuits 55a and 55b in time to be latched in the system latches 60 and then immediately sent out. This special latch and multiplexer scheme is used for the data and parity bits as well as some of the error signals. The following description provides details on this scheme.

To assist in the understanding of the following description, the term normal fetch means that no data wrapping occurs across the 64-byte (4 array transfer) boundary. Thus, transfer sequences 01234567, G34567, 456, G7, etc. are allowed, but 12345670, 670123, 70, etc. are not allowed. The 01234567 sequence is shown in the FIG. 9 timing diagram. The term page fetch refers to full eight transfer operations only, where boundary crossings are allowed. Start even sequence examples are 23016745, 67452301, etc. Start odd examples are 10325476, 54761032, etc.

For normal or page fetches that send the even ECC A 55a) system transfer out first, the following actions occur. Timing gaps for the allowed start and odd non-page operations are shown as G's. The 16-byte array fetch is latched in LGA 51a and 51b of both modules on the card. This point is shown for a fetch in FIG. 9 at clock point 3. The four ECCs across both modules process this data, and the full 16 bytes are latched in LGB 57a and 57b at clock point 5. The 16 bytes latched in LGB 57a and 57b hold the data for the second 8 byte system transfer while the next 16-byte array transfer, that is latched simultaneously in LGA 51 at clock point 5, is pipelined through the ECC logic 55a and 55b. The held LGB data is also used for full 16-byte internal data loop (plus checkbits) that is used if extended ECC is invoked. At the same time (clock point 5), for this particular case (even first), the 8 bytes from each ECC A 55a is also fed to the system latches 60 via the "fast multiplexer" 74 path 0 and then driven on to the system bus. On the next clock (clock point 6), the previously latched 8-bytes from each ECC B 55b is fed from LGB 57b to the system latches 60 via "slow multiplexer" 73 path 1 and fast multiplexer 74 path 2. Thus, the contiguous 8-byte transfers off of the card are made up of 4-bytes from one module and 4-bytes from the other.

For normal fetches that send the odd (ECC B 55b) system transfer out first, the data gets latched in LGA 51a, 51b and LGB 57a, 57b and processed by the ECCs 55a and 55b in the same manner as the previous case. However, the ECC B 55b data is not latched in the system latches at LGB time (clock point 5). A one clock cycle delay is used to put a gap before the data transfer string, keeping the odd data latched up in the system latch 60 at clock point 6 and allowing the transfer string to be contiguous for this case. As a result, the same LGB to system latch multiplexer scheme used for the first case is followed, where the "fast multiplexer" 74 path 0 input to the system latches at LGB time is blocked.

For page fetches that send the odd (ECC B 55b) system transfer out first, the odd transfer is to be sent out immediately without a gap in front of it. In this case, the system latches are loaded with ECC B data at LGB time (clock point 5), via the "fast multiplexer" 74 path 1. On the next clock (clock point 6), the previously latched 8 bytes from each ECC A 55a is fed from LGB 57a to the system latches via "slow multiplexer" 73 path 0 and "fast multiplexer" 74 path 2.

All command activated diagnostic data transfers to the system bus come from "LGB like" latches that hold data from a prior cycle. Since the long LGA-ECC path is not involved in the first bus transfer, all diagnostic command fetch transfers are routed via the "slow multiplexers" 73. To accommodate the number of diagnostic fetches required for the memory card according to the invention, an additional "slow multiplexer" 73 path input (3) is added to the "fast multiplexer" 74 to make it a balanced 4-to-1 multiplexer. The "slow multiplexers" 73 can be made as wide as needed. This width increase relates to previously mentioned increase in transfer depth that can be obtained via the flexibility of the multi-use data bus. Diagnostic data transfers that are not command related, but are related to the internal special function register (SFR) (56 in FIG. 4) settings are routed into the data path prior to the LGB latches and the output multiplexers. Thus, their transfers are handled according to one of the three cases above.

Figure 10:
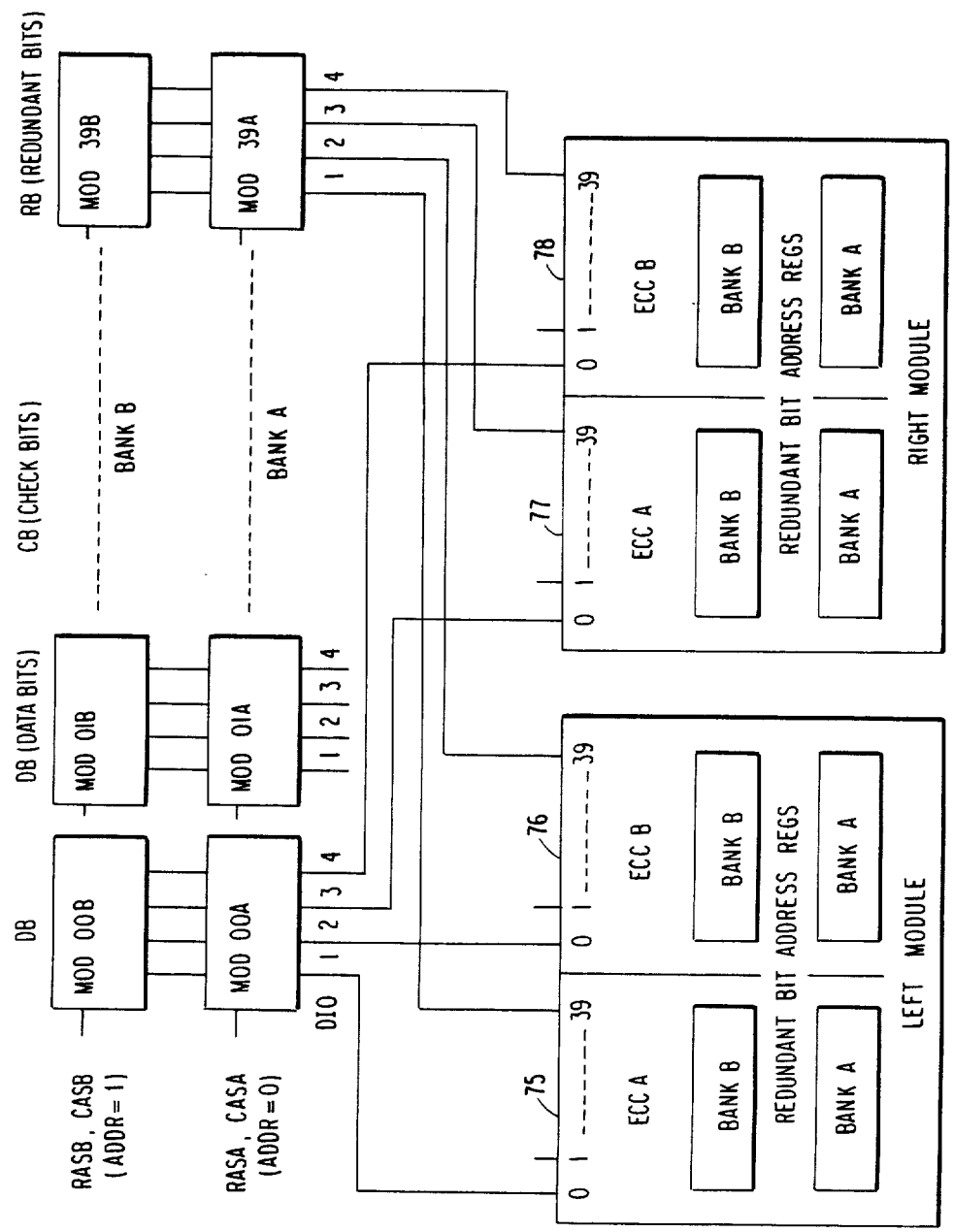
FIG. 10 is block diagram showing the internal array bus according to the invention.

As shown in FIG. 10, the use of four separate 4-byte ECCs 75, 76, 77, and 78 on the card provides a means to do 4-byte direct store operations even though the on-card array bus is 16 bytes wide. This is crucial to system performance when no cache exists, since more of the main memory stores are less than 16 bytes. With this more granular ECC approach, all stores starting on the ECC boundary, in 4-byte increments, can be done as direct stores. When direct stores cannot be performed, added cycles for a read-modify-write (RMW) are needed to obtain the same results.

The use of four 4-byte ECCs also allows the memory arrays to be used in a by 4 ($\times$4) configuration instead of by 1 ($\times$1). Using the arrays by 4, four data I/Os per chip, allows for better memory granularity. That is, for a set memory chip density, a smaller card address density can be achieved by decreasing the depth of the memory within an individual bank by increasing the I/O width of the arrays within that bank. For example, to get a 16-byte bandwidth using 512K$\times$2 arrays, 80 arrays are needed. The additional arrays are for check and spare bits associated with each ECC. Thus, the memory depth of the bank is 512K and the bank size is 8 megabytes (Mb). The smallest two bank card is 16 Mb. There must always be at least two banks for the required interleaving that was previously described. If the 1 Mb DRAMs are configured 256K$\times$4, then only 40 arrays are needed to get the 160 bits for the bank (128 bits for the 16 bytes, 28 bits for the check bits, plus four spare bits). Thus, a bank is only 256K deep and 4 Mb in size. The smallest two bank card can now be only 8 Mb. The full range of card densities for the processor is then achieved by adding more array banks of the same width. By going by 4 to reduce granularity and having four ECCs for direct write efficiency, a key reliability benefit was realized by architecting the internal array bus in a certain manner, as represented in FIG. 10. The I/O 1's from each array are fed to the first ECC 75, I/O 2's from each array to the second ECC 76, I/O 3's to the third 77, and I/O 4's to the fourth 78. In this way, a large array failure, like a chip kill, will at most only affect one bit per ECC word. This allows the single error correct (SEC) hardware to operate most efficiently to cover the fail.

The redundant array is also configured by 4. In this way, a redundant bit (spare bit) can be provided for each ECC word. The logic has the capability to allow all four bits of the redundant array to be swapped to replace a chip kill or only a portion of the bits to replace chip I/O failures. Redundant bit address registers are provided on chip to control this swapping for each individualized ECC. Added redundant bit address registers also exist to provide separate control between banks of arrays on the card. Thus, the redundant array in one bank can swap out a chip kill in position 1, while the redundant array in another bank can swap out a chip kill in position 9. It should be noted that the combined effect of four ECCs and using the arrays in a by 4 configuration can only be fully realized when arrays with data selects are used. Thus, use of 1 Mb and 4 Mb arrays with individual data selects provides a key performance edge over standard arrays that do not have data selects.

Referring back to FIG. 4, the inherent impact of the ECC logic delays is minimized in the memory card according to the invention by employing, for fetch operations, a unique double latch group 51 and 57 data flow design that also greatly minimizes circuit count. For stores, the double latch pair is 53 and 57, and for operations requiring internal data looping, the double latch pair would be 54 and 57. The synchronous double latch scheme, where data is latched into and out of the ECC 55, allows data to be pipelined through the ECC 55 at a fast rate. In addition, the ECC input latch 51 on a fetch improves overall ECC performance by synchronizing data into the ECC encode circuits. This is crucial when one or more arrays are defective and their data output is at an indeterminate level. The input latching forces this data to either a good or bad state, both of which can be handled by the ECC, and XECC if needed. Synchronization on the ECC output ensures that all data and parity are valid when a transfer to the system is to occur on a fetch, especially when a bit is corrected, and that valid check bits have been generated for a transfer to the arrays, if a store operation is being performed.

The double latch synchronous design also allows for flexibility related to different clock rates. Flow through the ECC 55 can be tuned to the clock rate by pipelining data from latch to latch by some multiple of the clock rate that will allow enough timing margin for the slowest latch-to-latch path. The low end processor that uses the memory card according to the invention has a 40 ns clock rate; thus for a fetch, the ECC path is tuned for one clock delay from LGA latches 51 to LGB latches 57. The same would be true for a store operation. For the 27 ns high end processor clock rate, two clock cycles are allowed for the internal latch-to-latch transfer. To provide for one clock transfers across the external system bus, the card internal latch groups are placed around the internal logic in such a way as to limit delay from receivers to latches and latches to drivers. The design target was to have no combinatorial logic between them.

To minimize the time required to get through the internal fetch path logic, parity generation is done in parallel with the ECC encode logic. In fact, much of the parity generation logic is made up from portions of the encode logic, thereby saving circuits. To account for a possible data bit correction within a byte by the ECC, the parity bits have correction exclusive ORs in their paths similar to those in the data paths. If any bit in a byte is corrected (inverted), then the associated parity bit is inverted to maintain proper parity on the system bus.

Circuit count is greatly reduced by this architecture by having the latch flow through the ECC and other internal logic be unidirectional. This holds for all operations including internal loops for XECC and RMW. This indirectly reduces the overall ECC path delays by minimizing device loading and decreasing on-chip wire lengths. The bidirectional data flow effect on the chip is achieved by unique routing between the latch groups 51, 53, 57, and 60, as depicted in FIG. 4, and the system and memory driver and receiver pairs 61, 62 and 50, 58 respectively. ECC output latches 57 feed memory directly on stores and go through the output circuit 60 to the system during fetch operations. ECC input latches 51 and 53, respectively, are fed by memory receivers 50 on fetches and system receivers 62 on stores.

A key feature of the card interface is the wide, multi-use data bus. Use of this bus limits the number of control inputs and status and error outputs that must be added to this memory system interface for proper card function. Thus, it is the key solution to the function versus chip/module input/output (I/O) limitation faced in the card design. The multi-use data bus is also the key solution to the card flexibility requirements. The multi-use bus specification at module I/O level is as follows: (Refer to FIGS. 11A and 11B.)

Figures 11A, 11B:
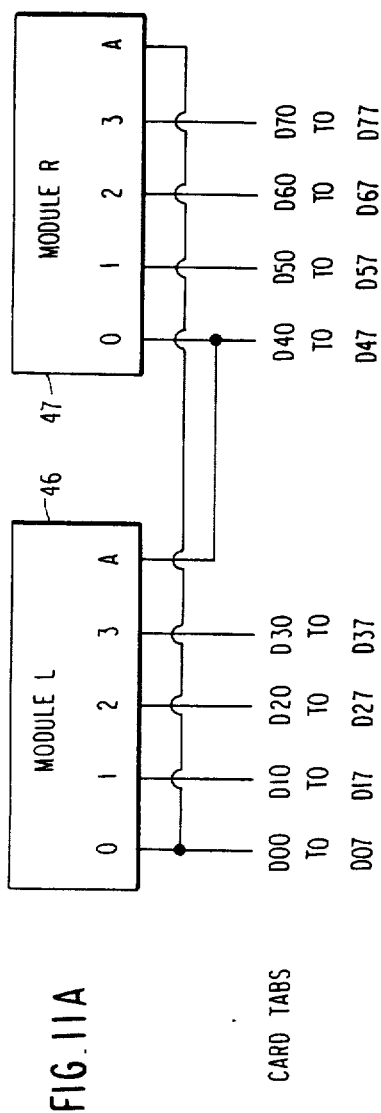
FIG. 11 is a block diagram illustrating the multi-use bus according to the invention.
Figure 13A:
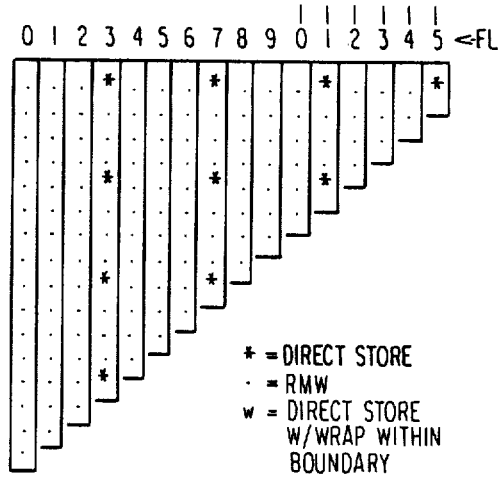
FIGS. 13A to 13H are tables showing read-write-modify (RMW) options based on field length and starting byte address for a two card port sorted by system transfer.
Figure 13B:
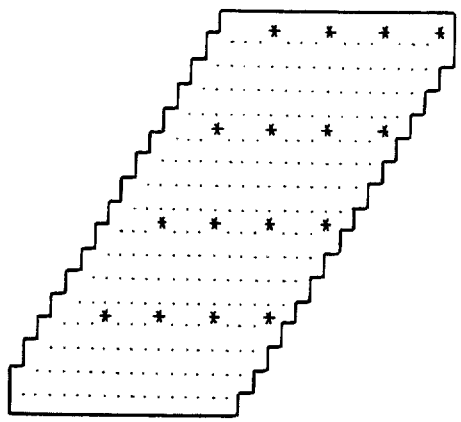
Figure 13C:
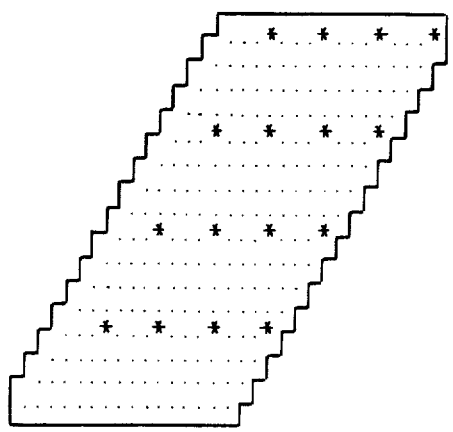
Figure 13D:
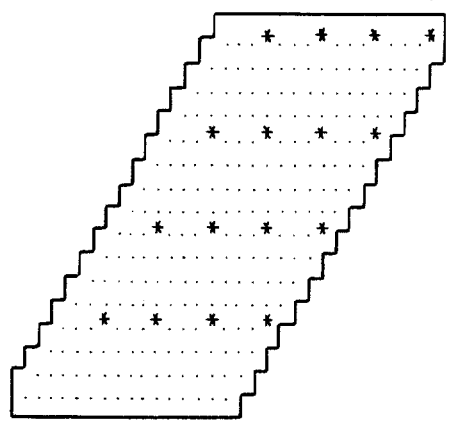
Figure 13E:
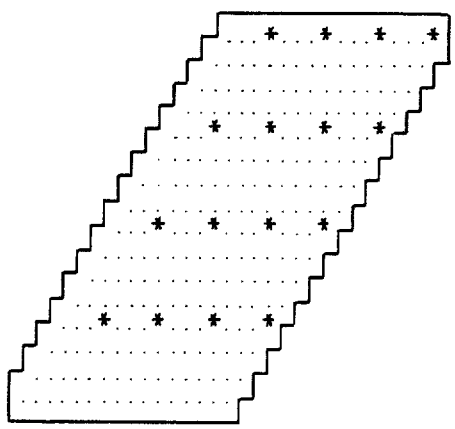
Figure 13F:
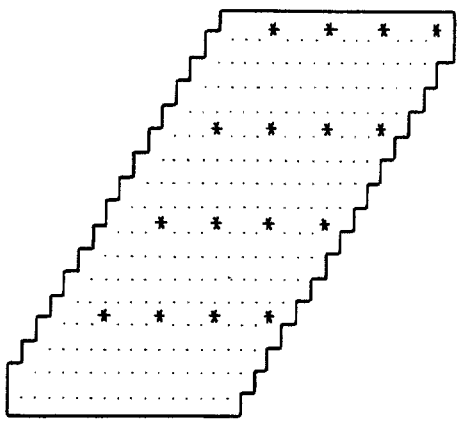
Figure 13G:
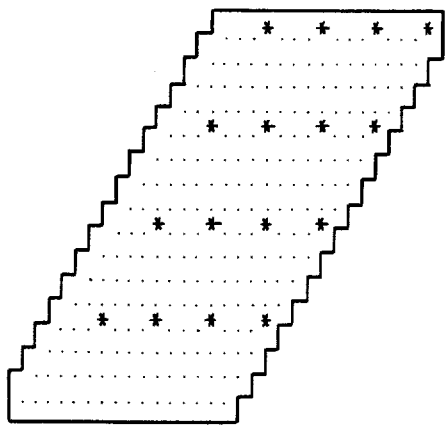
Figure 13H:
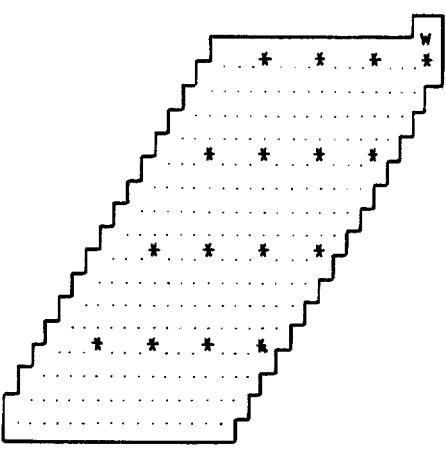

Module I/O bus (45 total bits)
 (a) Bytes 1-3 for bidirectional data or address input (24)
 (b) Byte 0 for bidirectional data or command, field length input (08)
 (c) Auxiliary byte for input of byte 0 of other module (08) (Note that this multi-drop allows the single input of command and field length information at the card tabs to be shared by the logic modules. This multidrop also allows the entire command and address to be transferred to the card in one cycle, which improves performance.) This auxiliary byte card level routing to the two logic modules is shown in FIG. 11A.
 (d) Bidirectional parity bits 0-4 for the four bidirectional data bytes (04)
 (e) Parity bit input for auxiliary byte (01)

The multi-use data bus reduces the total number of card signal I/Os at the system interface by multiplexing different input and output data fields over the same bus lines. The actual multiplexing assignments with data and address/command/field length is shown in FIG. 11B. For example, Data byte 0 of module L (FIG. 11A) is multiplexed with the field length portion of the "command" word that gets sent to the card when select (SEL) is asserted. Note that the auxiliary byte (denoted by BYTE A) only exists for the "command" word and not for any data word transfers. The associated parity bits are not shown in FIG. 11B. Most importantly, this directly relates to a reduction of chip I/O signal pads and module I/O signal pins on the card logic. The specific data fields, of the multi-use bus, for the preferred embodiment of the "smart" memory card are in the following listing:

(1) Input Fields
 (a) Command/Field Length/Address ("command" word)
 (b) Normal Store Data (including parity)
 (c) Diagnostic Data (1) Control Register Loads
  (i) Special Function Register 72
   (internal control of data flow logic)
   (non-command diagnostic operation initiation)
  (ii) Redundant Bit Address Registers 56d
   (controls internal bit swapping)
  (iii) Program Register 71
   (initialization of internal control logic)
  Data Register Loads 56f
  (i) Check Bit Register
  (ii) Redundant Bit Register
 (d) Diagnostic Data (2)
  Data Loop Stores
  Direct Check and Redundant Bit Stores
  Store without ECC
 (2) Output Fields
 (a) Normal Fetch Data (including parity)
 (b) Diagnostic Data (1)
  Control Register Reads
  (i) Special Function Register 72
  (ii) Redundant Bit Address Registers 56d
  (iii) Program Register 71
  (iv) Mask Register 56c
  Data Registers Reads
  (i) Check Bit Register 56f
  (ii) Redundant Bit Register 56f
  Status Register Reads
  (i) Syndrome Registers 56a
  (ii) Checker Information 56b
  (iii) Extended ECC Counter 56e
 (d) Diagnostic Data (2)
  Data Loop Fetches
  Direct Check and Redundant Bit Fetches
  Fetch without ECC In the above listing, Diagnostics (1) refers to those that are command driven. Refer to FIG. 12 for command listing. Diagnostics (2) refer to those that are controlled by special function register (SFR) 72 settings. Note that the loading of SFR 72 is command driven. Refer to command HEX in FIG. 12. Note that FIG. 12 also contains a "hex code interpretation" chart and examples.

The logic on the memory card is divided into two main areas: (1) the control logic, 46b–e or 47b–e of FIG. 3, which consists of a supervisor 64 (state machine control), array control logic 63, and data flow control logic 65 of FIG. 5; and (2) the data flow logic itself, 46a or 47a of FIG. 6, which contains the ECC and redundant bit swap logic and various data routing paths between the on-card array bus and the off-card system bus.

The multi-use data bus handles most of the control input signals via the command/field length/address transfer at card select time (active SEL input), or via internal registers that get loaded by one of the diagnostic commands (060 or 0D0 commands shown in FIG. 12). The only two dedicated module inputs that had to be added, outside of this bus other than those for clock and driver control macros (17 signals) and non-system use array test signals (2), are listed below. The clock and driver macro I/Os are not addressed here since they are standard on most or all cards in the system.

Minimized Set of Control Inputs
 (1) SEL: card select signal
 (2) REF: card refresh activation signal The multi-use data bus handles most of the status and error signals via diagnostic fetch commands (160 or 1D0 commands shown in FIG. 12). The only status module I/O that had to be added, outside of the multi-use bus, are listed below:

Minimized Set of Status/Error Outputs
 (1) BUSY: card busy status signal
 (2) XFER: valid data transfer to system status signal
 (3) MCL: machine check error signal
 (4) MBE: multiple bit error signal
 (5) SBE: single bit error signal
 (6) UCE: uncorrectable error signal The only remaining module I/O not covered by the multi-use data bus, and the aforementioned signals, are the cross chip communication signals required between the logic, that are listed below:
 (1) MSYNC: machine check synchronization signal
 (2) XSYNC: extended ECC synchronization signal
 (3) SSYNC: scrub synchronization signal
 (4) MACKN: machine check acknowledge signal
 (5) XACKN: extended ECC acknowledge signal (6) SACKN: scrub acknowledge signal Although this interface is somewhat similar to the memory interface in the prior IBM 9370 processor, a major improvement in the way commands are handled provides for more function capability, more flexibility, and fewer system commands. The prior IBM 9370 processor memory interface has a 7-bit command field where all bits are decoded to provide a fixed number of dedicated commands. This was sufficient for the diagnostic commands, but it was somewhat restrictive for fetch, direct store, and read-modify-write (RMW) operations. This somewhat random decode scheme only provided for six different store "lengths" and six different fetch "lengths" from 4 to 64 bytes. Read-modify-write is covered by sixteen separate commands that consist of separate fetch commands and separate partial store commands generated by the system.

The improved IBM 9370 processor memory interface according to this invention has a 10-bit field that is configured in the following manner. There are only two command bits, one for fetch/store control and one for normal/diagnostic operation control. These are the top two bits shown in the "Hex code interpretation" listing of FIG. 12. The other eight bits, shown below these in FIG. 12, are used in two ways. For diagnostic commands, they are used as a straight decode to select a dedicated diagnostic operation. However, for normal commands, they are used to indicate the field length for that fetch or store. That is why the normal commands are shown with Xs (2XX, 3XX). The Xs represent different hex values that can exist for allowable store or fetch "lengths". The field length, in combination with the starting byte address, provides flexibility on an individual byte basis by allowing from one to up to 256 sequential bytes per card to be operated on by that single command. The actual implementation on a card basis is up to 64 bytes. This can easily be extended to 256 byte potential by changing the logic, and the 256 byte limit can be changed by adding more field length bits to the architecture. The biggest advantage is that only one command is required for any normal store operation, and only one separate command for any normal fetch operation. For stores, starting address and field length for this one associated command are used by the on-card logic to automatically determine if a direct store is to be done, or if one of the 8256 unique read-modify-write operations is to be done internally.

FIGS. 13A to 13H show the relation between the starting byte address, as indicated by the numbers in the "SB" columns, and the field length, as indicated by the numbers in the "FL" rows. For example, a "321" command would be interpreted as follows based on the FIG. 13 tables. The Hex 3 would mean that it was a fetch command (3XX). The Hex 21, which represents the two Xs and thus the field length for the associated fetch command, is interpreted as FL=33. If the associated starting byte address was SB=000, then to find a "." or "*" in a box that corresponds to these, one would go to FIG. 13C. FL=33 and SB=000 corresponds to a "." in the box. The "." and "*" only have a unique meaning when considering store commands, and their meaning is explained in FIG. 13A. The "three transfers" relates to the number of system transfers that must occur to fetch out the associated data. The "(HE)" refers to a two card port. These tables show a maximum FL of 127 which relates to a maximum number of 128 bytes that can be moved in eight transfers. Since the previously mentioned maximum for one card is 64 bytes, two cards would be needed for 128 bytes.

Multiplexing on the multi-use data bus allows for any number of diagnostic stores or fetches to special on-card control registers. Each of the two logic modules on the memory card have two key control registers that provide for much of the flexibility associated with the interface according to the invention. Although on-chip control registers are a very common design tool, it is the combination of memory card related functions supported by these registers that make them unique. These functions are listed and briefly described.

The special function register (SFR) 72 is used to modify how normal commands are executed in the data flow, or how the data flow paths themselves are configured for any operation. The 24 bits of the register provide for the following functions and allow for future functions to be added based on future upgrades. This register could easily be extended to 32 bits or beyond. The prior IBM 9370 memory card only had four SFR bits. Three were decoded to provide the following eight functions:

(a) No special function; (b-d) Hard fail simulation for only one data bit, one check bit, or both per module; (e) Inhibit ECC on normal read; (f) Simple data loop without memory; (g) Memory overhead bits on normal fetch/store commands; and (h) Disable redundant bit register on store without ECC. The fourth SFR bit was used to select different modes for enables of the syndrome register. The SFR 72 according to the present invention allows the following control:

1. DATA LOOP—Three different data loop operations are provided to allow the system to store and fetch card data without going to memory. This allows three key data flow paths on the card to be checked out without interference from (or disturbance to) memory. This function also provides for a variety of other diagnostic uses and can even allow the card to be used as a small cache.

2. MEMORY OVERHEAD BITS ON NORMAL COMMANDS—This allows for rapid testing of all check bit and redundant bit array locations using normal store and fetch commands. This helps to make up for the system's inability to use the "array test mode" operation to rapidly test all array locations on card. The "array test mode" is described in more detail hereinafter.

3. HARD FAIL SIMULATION—This allows certain bits to be stuck at one value without physically damaging the card. The full capability of the card Extended ECC operation can only be verified if a hard fail exists (stuck bit). Since cards are to be shipped with "clean" memory (no array faults like stuck bits), then a stuck bit must be activated in the logic to simulate an array problem. There are two bits per ECC that can be stuck (four per module). Each stuck bit is controlled by a single bit in the SFR, not a decode of several bits. Thus, any combination of the four bits is possible.

4. ECC INHIBIT—ECC operations associated with fetches or stores can be inhibited. No correction or data error signals on fetches and no check bit generation on stores. Redundant bit can also be controlled in conjunction with the check bits. The IBM 9370 processor design required a dedicated command to do the ECC inhibit on stores.

5. EXTENDED ECC INHIBIT—Extended ECC can be separately blocked on fetch commands or prefetches associated with read-modify-write, or both.

6. EXTENDED ECC COUNTER—The rate at which the Extended ECC counter triggers the activation of an external status signal is controlled by this register. The system monitors this status line to get an indication of how "dirty" the memory might be. It is used as an indication that a diagnostic routine should interrupt normal operations at an appropriate time to determine the extent of any array failures and the possible use of a spare bit(s) to swap out a large section of failing memory that could lead to serious system performance degradation or even an escape of bad data.

7. SYNDROME REGISTERS—The SFR controls when the internal registers hold syndrome data of a particular operation for later readout. The registers can be enabled based on four different error cases: (1) No error—registers get updated on each fetch transfer. (2) Registers get updated and held only on the occurance of a single bit error. This can be used during debug to catch the occurrence of an intermittent single bit error during an extended run. The held syndrome can then be used to pinpoint the array bit associated with that failure. (3) Registers are updated and held on any multiple bit error. (4) Registers are updated and held only for a single bit error during an Extended ECC operation. The syndrome for this case can be used to determine the type of double bit failure that triggered the Extended ECC operation. If the XECC operation itself was unsuccessful, then two soft (or 4, 6, 8, 10, etc.) failures exist. If XECC was successful and the associated syndrome for the affected ECC(s) was all zeros, then two hard failures existed and were corrected. If the syndrome is a valid odd value, then one soft and one hard failure existed and were corrected. The XECC operation will scrub the soft error out of memory and the odd syndrome value will indicate where it was located. A hard failure is an actual fault in the memory that must be physically replaced by a new array or swapped out electrically. A soft failure is data in an array that has been altered by radiation or noise. The array is not damaged, and therefore the failure can be corrected.

8. SCRUB FREQUENCY—Activates soft error scrubbing during refresh time and controls the rate at which it will occur.

The program register 71 is used by the control logic to personalize the operation of the card based on system input, which is determined by monitoring what kind of card types are plugged in and knowing what the system configuration is. Appropriate data stored in the system is then loaded into this register. The 32 bits of the register provide for the following functions and allow for future functions to be added based on future upgrades.

1. Card size indication
2. Number of array banks on card
3. Card position in the port
4. Number of cards in the port
5. ECC propagation delay
6. Memory driver skewing for simultaneous switching
7 Card BUSY signal programming
8. Variety of controls for varying array RAS and CAS pulses. This variation allows for use of different array technologies or to improve array timing margins based on actual hardware performance. No such program register existed in the prior IBM 9370 memory.

The card architecture according to the invention provides an "array test mode" feature that has minimal dedicated I/O and logic overhead, yet allows manufacturing test time on the card to be cut in half. "Array test mode" allows all data at one memory location on the card to be tested by a one array transfer (two system transfers) store and then a one array transfer fetch back, including check bits (CBs) and redundant bits (RBs). This is done by fully inhibiting on-card ECC and parity activity. ECC correction and parity generation is blocked on fetches, and ECC check bit generation and parity checking is blocked on stores. The four module I/Os for parity are used for four of the seven module check bits, and the four redriven I/Os for multiple bit error (MBE) are used for the three check bits and the redundant bit. MBE can be used since ECC is inhibited, and the receiver needed for bidirectional operation in "array test mode" already exists for checker circuitry on the MBE driver.

The test time reduction can be illustrated by comparing it to how the system diagnostics must test all the arrays in the card "system mode". For each memory address location on the card, the system must do the following for a store and a fetch. As will be seen, a total of eight system transfers must be done at every address location throughout the entire card memory space to test each array. This requires a substantial amount of time for card densities of 64MB and above. Note that a special function register option that moves only check and redundant bits on fetches and stores can be used in place of command 060 and 160, illustrated in FIG. 12. This still results in eight system transfers: Store:
  (a) Command 060 to load CB and RB registers (2 system transfers)
  (b) Command 2XX with ECC inhibited to load DBs (2 system transfers) Fetch:
  (a) Command 3XX with ECC inhibited to read DBs (2 system transfers)
  (b) Command 160 to read CB and RB registers (2 system transfers)

For the corresponding "array test mode", only the following need be done at each address location for a store and a fetch. As will be seen, a total of four "system" transfers must be done at every address location throughout the entire card memory space to test each array. Store:
  (a) Command 2XX (2 system transfers) Fetch:
  (b) Command 3XX (2 system transfers)

The only two dedicated I/O needed for this function are CTM and RESET. CTM switches between the "array test mode" and "system mode". RESET provides a means for the card to be initialized without the need for extensive scanning. The system does card initialization and much of its diagnostics through the use of scanning. The addition of reset and the commands for internal register loads and reads (commands 060, 0D0 and 160, 1D0) allows manufacturing testing to be done with just enough scanning to ensure that the scan path and associated controls are wired up on the card. This allows for a reduction in tester overhead and test time. The continuity of the scan path on the chips is verified at chip/module test, and the related functions of the scan latches are checked in "system mode" during card test of the logic.

The "array test mode" capability on this card would also allow a different system, with ECC off of the memory card, to be able to use this card. In this case, check bits and redundant bits would be available in parallel with the data bits for the off-card logic to use. On card RB swapping could still be used in this mode. The fact that parity bits are not generated is not a concern, since ECC protection for the arrays is now carried across the on-card logic and the off-card bus.

By combining existing memory design techniques with unique features according to the present invention, a common yet powerful and flexible memory interface and architecture has been achieved that can meet the new version of the IBM 9370 processor's performance and functional requirements.

Memory cards with self-contained error correction capabilities must provide two modes for handling system stores to memory, in order to minimize system interaction with the memory. One mode is a direct mode, and the other mode is a partial store which is referred to as a read-modify-write (RMW). The direct store can occur when the data to be overwritten fits fully within one or several card ECC boundaries. A preferred embodiment of the invention has four 4-byte ECCs. Thus, a 4-byte direct store can be done if all four bytes are fully within only one of the ECC boundaries. The capability to do 4-byte or 8-byte direct stores with the 16-byte on-card interface to the arrays allows for significant system performance improvements when a cache memory does not exist to buffer the main store memory. When the data to be stored does not start and end on an ECC boundary, then a RMW operation must be performed. On-card ECC necessitates that a prefetch of the data to be overwritten be done first. If possible, this pre-fetch allows the ECC and Extended ECC logic to clean out any and all errors that exist in the associated ECC words. If this was not done, errors residing in the non-overwritten portion of an ECC word would be masked by generation of correct check bits for bad data. If not fully overwritten in the future, this error will result in an escape of bad data on the next fetch to that location. RMW performance degradation is related to pre-fetch operation, which greatly adds to the net cycle time for the resultant store to memory. This time is greatly reduced by implementing this function on the memory card, and not in an external memory control unit.

To handle these two modes, the command set for the prior IBM 9370 processor main store has six separate commands for direct stores of four to 64 bytes, eight separate commands for the different read (pre-fetch) portions of a partial store, and eight separate associated commands for the different write portions of a partial store. Thus, the system must determine which mode is to occur and what commands to send. This locks the interface to a specific on-card ECC configuration, and a limited number of array types. Future upgrades to the system may require a change to the interface. The interface and architecture according to the present invention allows for optimal flexibility by requiring little from the system. A greatly reduced command set combined with a restructured command data format provide for simple and transparent operation. These enhancements, from a hardware standpoint, are detailed in the following paragraphs.

The command word for the IBM 9370 is composed of eight command bits and twenty-four address bits. As previously mentioned, a decode of the full eight bits is needed to select from twenty-two different commands to do a particular direct store or RMW. For the RMW, the selected command indicates the number of bytes to be modified, and only two bits of the address field are used to point to the starting byte in that module. Thus, a significant amount of system action is required to perform a limited number of RMW options.

The preferred embodiment of the invention, for the IBM 9370 follow on, has a "command word" composed of two command bits, eight field length bits, and thirty address bits. A fifth byte of the "command word" at each of the two modules on the card, with only 64 unique bits at the card tabs, is accomplished by feeding two of the eight bytes to both modules. Refer to FIG. 11A for an illustration of how these auxiliary bytes are actually wired on the card. The two command bits select between a store or fetch operation and between normal or diagnostic operation. On the present design, seven of the eight field length bits are used to select the number of bytes to be written for the eight system transfers; i.e., a field length of 0000000 for 1 byte up to a field length of 1111111 for 128 bytes. The range up to 128 bytes allows for a RMW operation across a two card port. The eighth field length bit is available to allow for a RMW operation that is 16 system transfers deep, instead of only 8. The full address field selects the starting location, within the full memory space, of the four array transfers that will make up the RMW cycle, seven bits of which will be used to indicate the starting byte within the associated grouping of four array transfers (eight system transfers). For a two card port, with a starting byte of 000, the number of bytes that can be written can vary from 1 to 128. For a starting byte of 127, only one byte can be written. Thus, there is no wrapping allowed across the boundary. The resulting RMW operations that can be performed is shown in FIGS. 13A to 13H. Details on how to interpret these diagrams are described above.

One card and two card port boundaries are shown in FIGS. 14A and 14B. The numbers in the boxes of FIGS. 14A and 14B represent byte numbers. For example, a sub-box with 20 in it actually represents four bytes numbered 20, 21, 22, and 23. "MOD" represents whether the associated bytes are in the left or right module on the card. Each module has two ECCs as indicated by A or B. "Start" indicates whether the starting address (system transfer) is either even (ECCA) or odd (ECCB). Only one module part number is used across a two card port. Thus, the four modules across the port need to be uniquely personalized to perform the various RMW operations. Module position on a card is determined by a hard wired module pin. The card position within the port is determined by system personalization of the program register in that module.

There are a number of key features pertaining to the RMW operations. During a store command, the starting address and field length will determine whether a direct store will occur, or whether a RMW (partial store) will occur. Direct stores only occur when all the data to be written falls exactly within a 4-byte boundary(ies) that corresponding to an ECC word(s).

A RMW with its starting address off an ECC boundary and its ending address on a boundary will consist of a prefetch/store transfer and be followed by up to seven direct store transfers. This is referred to as PW RMW case. A RMW with starting address on boundary and ending address off will end with a prefetch/store transfer and be preceded by up to seven direct store transfers. This is referred to as a WP RMW case. When starting and ending addresses are both off boundary, then prefetch/store transfers occur at both ends with up to six direct store transfers in between. This is referred to as a PP RMW case. When only one transfer is to occur, then this case becomes a single prefetch/store operation. These three different types of RMW cycles cover all possible RMW combinations. Eight system transfers are referenced above since it is the maximum number of transfers allowed per card command cycle. Any RMW operations with less than eight transfers are a subset of one of these three groups. Refer to FIG. 15 for the full illustration of these three different RMW types. The basic concepts of this on-card RMW function can also be extended to more than eight transfers. The card was architected to allow for full RMW flexibility, while keeping the control logic relatively simple. To keep the minimum number of RMW types to three, RMWs are only done on a contiguous set of bytes. Thus, the prefetches can only occur at the beginning and ending bytes of a continuous block of data. No prefetches can occur in the middle.

During a prefetch, ECC will be active across the entire card (or two card port); however, Extended ECC (XECC) will only be triggered if a multiple bit error occurs for an ECC that has a partial store within its boundary. The multiple bit error signal will not be activated if XECC is started, as it is for a normal fetch related to XECC. The XECC operational steps occur across the entire card (port) even though activated by only one ECC. This is done to keep array timings in sync. Some of the above mentioned cross chip communication lines (XSYNC, MSYNC, SSYNC, XACKN, MACKN, SACKN) are used to synchronize two modules on a card or four modules across a two card port. However, workings within each XECC operation will vary depending if that ECC has a partial store occurring within its boundary or not. This will be detailed below. An unsuccessful XECC operation on data within a partial store ECC boundary will activate uncorrectable error (UCE) if the proper SFR bit is set. Whether or not UCE is active, bad data in memory will be restored, so that another access to that location will still present a detectable error and not an escape (undetected) of bad data. If the prefetch only has odd multibit errors, then UCE will activate without going into XECC. Another bit within the SFR can be used to deactivate XECC during RMW while allowing XECC on normal fetch commands. The single bit error signal will be active to indicate single bit corrects on prefetches.

Figure 16:
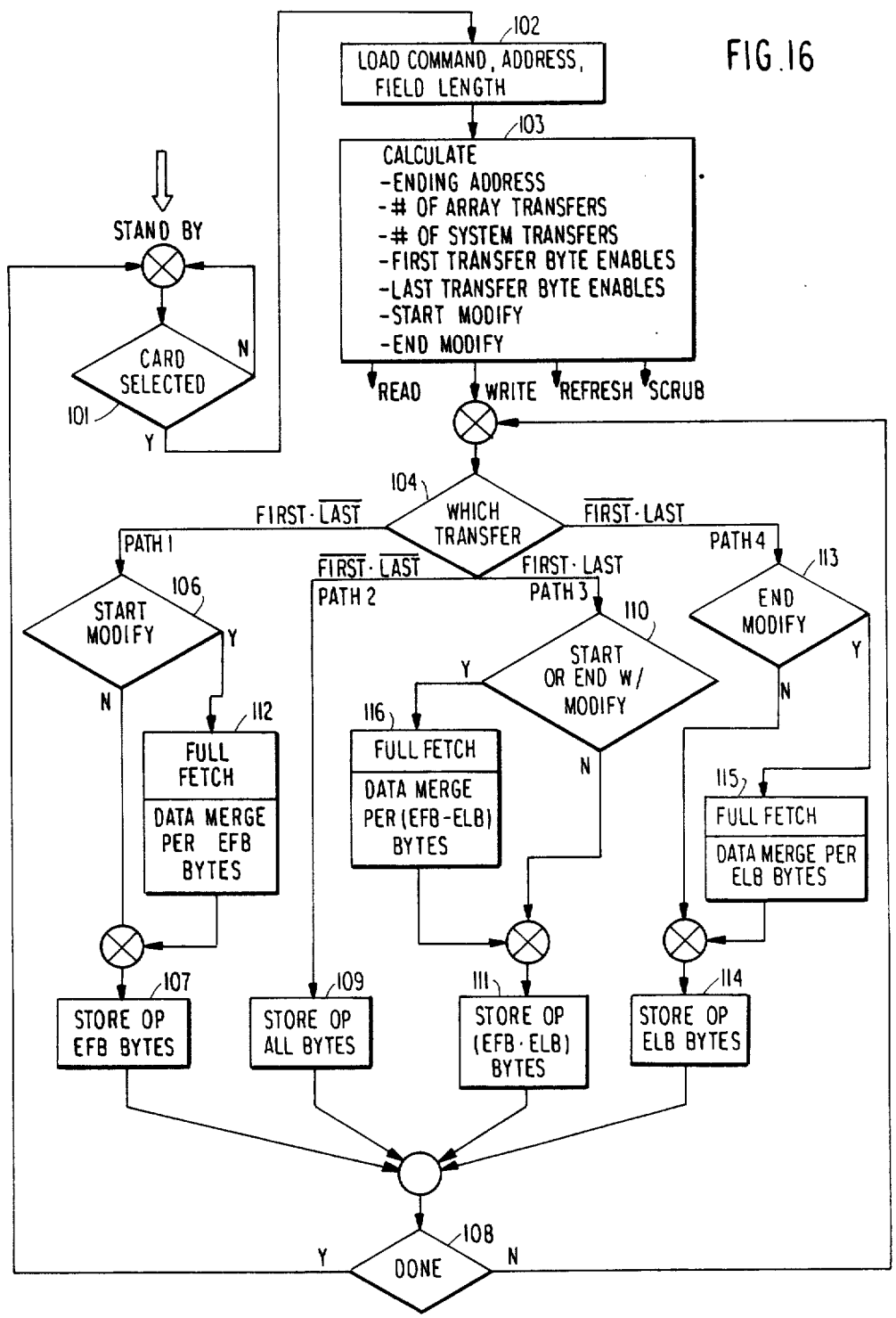
FIG. 16 is a flow diagram showing the logic of the RMW operation.

The basic direct store/RMW control procedure is shown in the flow chart of FIG. 16. Once the card is selected as determined in decision block 101, the command, starting address and field length are loaded as shown in function block 102. The loaded command, starting address, and field length are used as shown in function block 103 to determine the ending address, number of array and system transfers, first and last byte enables, and where prefetches are needed, if they are even needed at all. Based on these calculations, the one up to four (or more, if designed in) array transfers can proceed according to a sequence of operational paths as determined by decision block 104. The manner in which the above items are calculated is described in more detail hereinafter.

For a four array transfer direct store WWWW, the operational path sequence that will be followed begins with decision block 104 where it is decided to branch to block 106. In decision block 106, a test is made to determine if a start modify operation is to be followed. The result of this test will be negative, and in function block 107, a store of EFB bytes is performed before a test is made in decision block 108 to determine if the process is complete. The result of this test will also be negative, and control will loop back to decision block 104. Next, the logic will go to function block 109 where a direct store of 16 bytes is performed before going to decision block 108. This path is repeated again, for the third "W" transfer. Then for the forth and final W array transfer, the logic goes to decision block 113 where a test made to determine if the process is an end with modify. This test will be negative, and in function block 114, a store of ELB bytes is made to complete the process.

For a two array transfer PW RMW, the operational path sequence that will be followed begins with decision block 106 where the result will be positive. In function block 112, a full fetch is performed followed by a data merge per the EFB bytes. Control then passes via function block 107 and decision block 108 back to decision block 104 which then directs the process to decision block 113. The test in decision block 113 is negative, and control goes to function block 114 to complete the process.

For a two array transfer WP RMW, the operational path sequence that will be followed begins again at decision block 106 where the test is negative. The process loops back via function block 107 and decision block 108 to decision block 104 which then directs the logic to decision block 113 where the test is positive. Thus, control goes to function block 115 where a full fetch is performed followed by a data merge per the ELB bytes.

For a two array transfer PP RMW, the operational path sequence that will be followed begins again at decision block 106 where the test is positive and the rest of the path follows as described for PW, then loops to decision block 113 where the test is also positive and the rest of the path proceeds to completion as described for WP. For the special single transfer P RMW, the operational path that will be followed begins with decision block 110 where the test is positive. In this case, control goes to function block 116 where a full fetch is performed followed by a data merge of the EFB logically ANDed with the ELB bytes. For a single direct write transfer, the test in decision block 110 is negative. What is not shown in the flow chart is the decision made for each full fetch (prefetch) whether or not XECC needs to be activated. The various calculations referenced in this flow chart are shown below.

(1) Starting Address (SA) = Input Address
(2) Calculated Ending Address (EA) = Starting Address + field length (FL)
(3) Calculate (by binary addition) the number of Array Transfers (AXF) (based on one card port):

```
FL bits   7 6 5 4 3 2 1 0
SA bits +         3 2 1 0
                * * x x x x
``` where two * bits in sum plus one equals number of transfers (e.g., 01 = 2 transfers)

(4) Calculate (by binary addition) the number of System Transfers (SXF) (based on one card port):

```
FL bits    7  6  5  4  3  2  1  0
SA bits +              2  1  0
        * * *          x  x  x
``` where three * bits in sum plus one equals number of transfers (e.g., 111 = 8 transfers)

(5) Start with prefetch (e.g., PWWW) if (SA(1:0) not = '00'B) or ((EA(1:0) not = '11'B) and (no. AXF '00'B). Note (1:0) means two least significant bits (LSBs).

(6) End with prefetch (e.g., WWWP) if (EA(1:0) not = '11'B.

(7) First Array Transfer Byte Enable Decodes (EFB bytes)

| CRD> | 1 Card Port | | 2 Card Port | | | |
|------|-----|------|-----|------|-----|------|
|      |     |      | Left | | Right | |
| MOD> | Left | Right | Left | Right | Left | Right |
| EFB0 | =0  | ≦4   | =0  | ≦4   | ≦8'  | ≦C   |
| EFB1 | ≦1  | ≦5   | ≦1  | ≦5   | ≦9   | ≦D   |
| EFB2 | ≦2  | ≦6   | ≦2  | ≦6   | ≦A   | ≦E   |
| EFB3 | ≦3  | ≦7   | ≦3  | ≦7   | ≦B   | ≦F   |
| EFB4 | ≦8  | ≦C   | ≦10 | ≦14  | ≦18  | ≦1C  |
| EFB5 | ≦9  | ≦D   | ≦11 | ≦15  | ≦19  | ≦1D  |
| EFB6 | ≦A  | ≦E   | ≦12 | ≦16  | ≦1A  | ≦1E  |
| EFB7 | ≦B  | ≦F   | ≦13 | ≦17  | ≦1B  | ≦1F  |

In the above table, EFBn will be active if the Hexadecimal value of four LSBs of SA (for one card port) or five LSBs of SA (for two card port) are less than or equal to the given Hexadecimal value. ≦ 'F' Hex or ≦ '1F' Hex means EFB is always on.

(8) Last Array Transfer Byte Enable Decodes (ELB bytes)

| CRD> | 1 Card Port | | 2 Card Port | | | |
|------|-----|------|-----|------|-----|------|
|      |     |      | Left | | Right | |
| MOD> | Left | Right | Left | Right | Left | Right |
| ELB0 | ≧0  | ≧4   | ≧0  | ≧4   | ≧8   | ≧C   |
| ELB1 | ≧1  | ≧5   | ≧1  | ≧5   | ≧9   | ≧D   |
| ELB2 | ≧2  | ≧6   | ≧2  | ≧6   | ≧A   | ≧E   |
| ELB3 | ≧3  | ≧7   | ≧3  | ≧7   | ≧B   | ≧F   |
| ELB4 | ≧8  | ≧C   | ≧10 | ≧14  | ≧18  | ≧1C  |
| ELB5 | ≧9  | ≧D   | ≧11 | ≧15  | ≧19  | ≧1D  |
| ELB6 | ≧A  | ≧E   | ≧12 | ≧16  | ≧1A  | ≧1E  |
| ELB7 | ≧B  | =F   | ≧13 | ≧17  | ≧1B  | =1F  |

In the above table, EFBn will be active if the Hex value of four LSB of EA (for one card port) or five LSB of EA (for two card port) are greater than or equal to the given Hexadecimal value. ≧ '0' Hex means ELB is always active.

BYTE SELECTION EXAMPLES (Refer to FIG. 16)

(1) Single array transfer with prefetch/modify/write; to be specific, a 1-byte at address '02' Hex. System selects card, 101, with command, address, field length. Card loads them, 102.
Starting address and field length:
SA(7:0) = '00000010'B ('01' Hex)
FL(7:0) = '00001011'B ('0B' Hex) Card then calculates the following per block 103: Ending address:

```
FL(7:0)    00001011
SA(7:0) +  00000010
EA(7:0)    00001101
```

Number of array transfers:

```
FL(7:0)    00001011
SA(3:0) +     0010
SUM        00001101
```

AXF(1:0) = 00 therefore one transfer on array bus
Number of system transfers

```
FL(7:0)    00001011
SA(2:0) +      010
SUM        00001101
SXF(2:0) =     001    therefore two transfers
                      on array bus
```

Start Modify = TRUE, because SA(1:0)≠'00'B
End Modify = TRUE, because EA(1:0)≠'11'B
Calculate EFBs and ELBs in block 103:
Left ELB(0:7) = '11111111'B
Left ELB(0:7) = '11111111'B
Right EFB(0:7) = '11111111'B
Right ELB(0:7) = '11111100'B
Go to block 104, as it is a write command. At block 104, since this is only one array transfer, this is both the first and last transfer. Proceed to block 110. At block 110, start modify and end modify are both TRUE. Proceed to block 116. At block 116, full fetch, then merge data per the equation, and proceed to block 111.

```
Left Module: EFB(0:7)  =  '00111111'B
             ELB(0:7)  =  '11111111'B
             Logic AND =  '00111111'B
                          old    new
                          data   data
                          bytes  bytes Right Module: EFB(0:7)  =  '11111111'B
              ELB(0:7)  =  '11111100'B
              Logic AND =  '11111100'B
                           old    new
                           data   data
                           bytes  bytes
```

In block 111, store old data to left module bytes 0 and 1 and right module bytes 6 and 7 per the equation. Store new data to left module bytes 2 to 7 and right module bytes 0 to 5. Go to block 108. In block 108, the process is complete, and control goes to standby state in block 101.

(2) Two array transfer PW example; thirteen byte write at address 7. In block 101, system selects card, sends command, address, field length. In block 102, card loads them.
Starting address and field length:
SA(7:0) = '00000111'B ('07' Hex)
FL(7:0) = '00001100'B ('0C'Hex)
In block 103, the card makes the following calculations: Ending address:

```
               FL(7:0)     00001100
               SA(7:0)  +  00000111
               EA(7:0)     00010011
```

Number of array transfers:

```
   FL(7:0)        00001100
   SA(3:0)     +    0111
   SUM            00010011
   AXF(1:0) =       01      therefore two transfers
                            are to be done
```

Number of system transfers:

```
   FL(7:0)        00001100
   SA(2:0)     +     111
   SXF(2:0) =       010     therefore three trans-
                            fers on system bus
```

Start Modify=TRUE, because SA(1:0)≠'00'B
End Modify=FALSE, because EA(1:0)='11'B
The EFBs and ELBs are calculated in block 103 as follows:
Left EFB (0:7)='00001111'B
Left ELB (0:7)='11110000'B
Right EFB(0:7)='00011111'B
Right ELB(0:7)='00000000'B Go to block 104, as it is a write command. In block 104, this is the first of two array transfers. Next go to block 106. In block 106, start modify is TRUE, so go to block 112 where a full fetch and then merge data is performed per EFBs.

```
   Left Module: EFB(0:7) = '00001111'B
                              old  new
                              data data Right Module: EFB(0:7) = '00011111'B
                              old  new
                              data data
```

Go to block 107 and perform No-Op at left module bytes 0 to 3. Although the old data has been fetched and corrected, it is not stored back in memory, which would be a scrub operation. Next, store old data to right module bytes 0:2. Store new data to left module bytes (4:7) and right module bytes (3:7). Go next to block 108, and from there to block 104, since the process is not completed. In block 104, this is the last array transfer. Go to block 113 where end modify is FALSE. Go next to block 114 and note ELBs:

```
   Left Module: ELB(0:7) = '11110000'B
                              new  old
                              data data Right Module: ELB(0:7) = '00000000'B
                              old
                              data
```

Store new path to bytes (0:3) of left module and perform a No-Op to other 12 bytes. In this case, a prefetch has not been done, so that contents of these 12 bytes of memory are unknown and, therefore, they must be left undisturbed. Next go to block 108. The process is now completed and control goes back to block 101.

(3) Two array transfer WP example; 5-byte write at address 12 (decimal). In block 101, system selects card, sends command, address, field length. In block 102, the card loads them.
Starting address and field length:
SA(7:0)='00001100'B ('0C' Hex)
FL(7:0)='00000100'B ('04' Hex)
In block 103, the card makes the following calculations:
Ending address:

```
               FL(7:0)     00000100
               SA(7:0)  +  00001100
               EA(7:0)     00010000
```

Number of array transfers:

```
   FL(7:0)        00000100
   SA(3:0)     +    1100
   SUM            00010000
   AXF(1:0) =       01      therefore two array
                            transfers to be done
```

Number of system transfers:

```
   FL(7:0)        00000100
   SA(2:0)     +     100
   SUM            00001000
   SXF(2:0) =       001     therefore two system
                            transfers
```

Start Modify=FALSE, because SA(1:0)='00'B
End Modify=TRUE, because EA(1:0)≠'11'B
The ELBs and EFBs are calculated:
Left EFB(0:7)='00000000'B
Left ELB(0:7)='10000000'B
Right EFB(0:7)='00001111'B
Right ELB(0:7)='00000000'B It is a write command, so proceed to block 104. In block 104, this is the first of two array transfers. Go to block 106 where start modify is FALSE. Go next to block 107. In block 107, note EFBs:

```
   Left Module: EFB(0:7) = 00000000
                             keep old data Right Module: EFB (0:7) = 00001111
                             keep  store
                             old   new
                             data  data
```

Perform No-Op to left module bytes (0:7) and right module bytes (0:3). Store new data to right module bytes (4:7). Go next to block 108. Since process is not completed, go to block 104. In block 104, this is the last array transfer. Go to block 113 where end modify is TRUE. Go to block and perform full fetch then merge data per ELBs.

Left Module: ELB(0:7) = '10000000'B new   old
                                                data  data Right Module: ELB(0:7) = '00000000'B old data Go to block 114 and there store new data to left module byte 0, and old data to bytes (1:3). Perform No-Op on rest of bytes. Go next to block 108. The process is completed, and control goes to block 101 this is the end of the examples.

Data flow across the card or a two card port for a RMW cycle is personalized on a byte basis by the control logic. The control logic utilizes array data selects to enable word-by-word writes to the arrays. The control logic also generates internal Write Enables for each data flow byte. These enables control the fetch/store multiplexer logic shown in FIG. 6. When a byte is to be overwritten, the multiplexers 120a and 120b select data from the store buffer multiplexers 122a and 122b. The store buffer multiplexer logic is used to select the appropriate four byte words, that are buffered in sequence, for use at the appropriate time. When data is not overwritten, then the multiplexers select looped data from LPD latches 54a, 54b, via fetch/loop multiplexers 121a, 121b, that had been prefetched from memory and corrected. This looping and fetch/store multiplexer selection is only done on the data bit paths and not on the check bit or redundant bit paths. New check bits are generated by the ECC logic after the store buffer/looped data selections are made to form a new word to be stored. Data bit or check bit selection for the redundant bit store is then made after the new check bit generation.

Figure 17A:
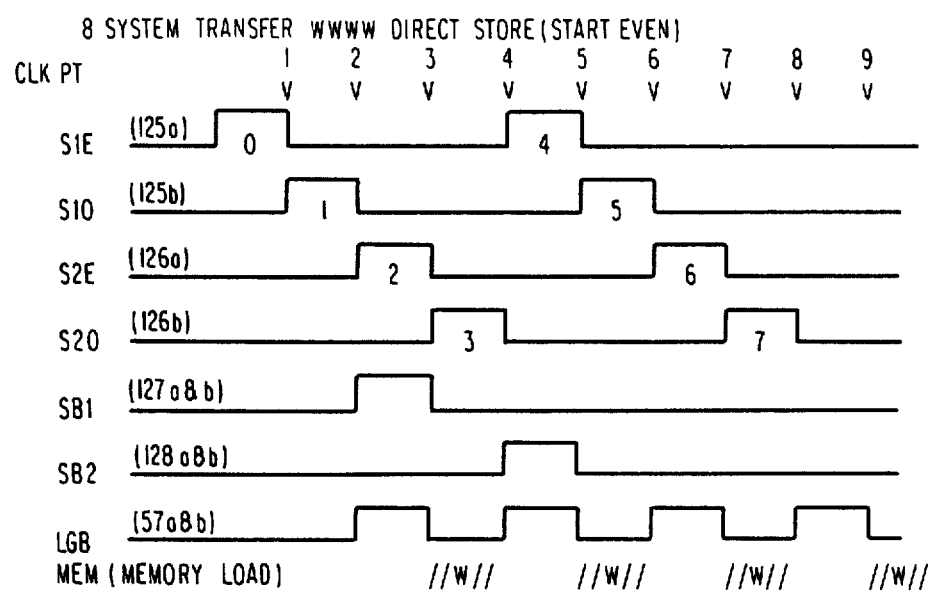
FIGS. 17A and 17B are timing diagrams illustrating the timing comparison between a four array transfer direct write (WWWW) to that of a two array transfer of a partial write (PW) where the first array transfer is associated with the prefetch.
Figure 17B:
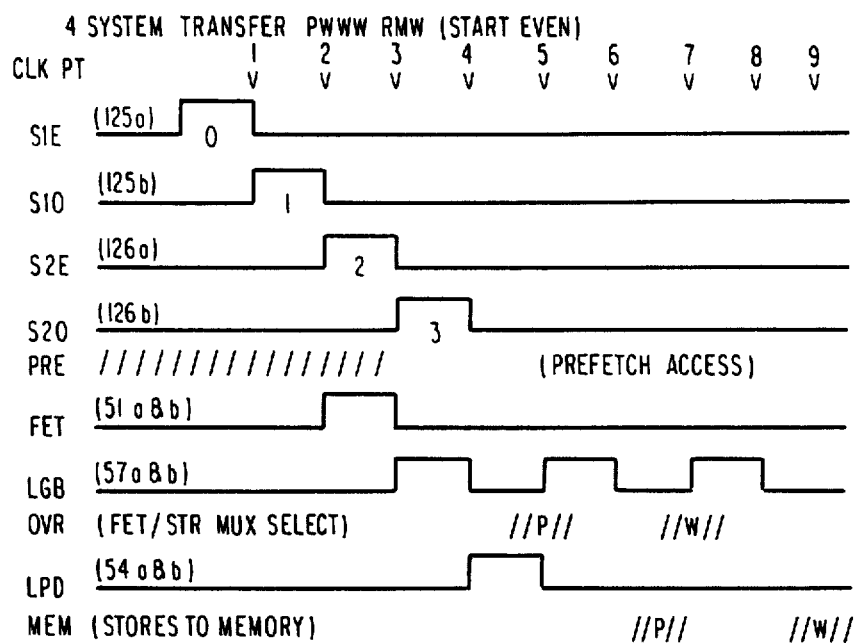

To optimize RMW performance, a store buffer 53 was added to the data flow to allow for contiguous system transfers of data during a store. For a direct store, the buffer need not be fully utilized since data can be pipelined through the data flow ECC logic 55a, 55b as it is stored. In the case of a start even address direct store, data is loaded at clock point 1 of FIG. 17 into SIE latches 125a, then at clock point 2, in S1O latches 125b. At this point, data is sent through the ECCs 55a and 55b. This allows for 8-byte system transfers to be converted to 16-byte array transfers. For a one clock ECC configuration, the next clock, clock point 3 will then latch data and generated check bits in the LGB latches 57a, 57b. At the same time, the next system transfer can be latched in S1E latches 125a again, and so on. To simplify the logic for the variety of store buffer operations, the previously mentioned pipeline operation for direct stores is actually somewhat modified to take advantage of the full store buffer. Thus, in addition to latching data into the ECC output latches (LGB) 57a and 57b at clock point 3, the next 8-byte data transfer is loaded into S2E 126a and the prior two transfers are shifted into SB1 127a and 127b. This shift will prevent an overwrite of the first transfer in S1E 125a when it is next updated at clock point 5, and so on. Then the fourth data transfer is loaded into S2O 126b at clock point 4. In addition to the S1E update at clock point 5, the previous third and fourth transfers are shifted into SB2 128a and 128b. At this point, all the first four transfers are in SB1 and SB2, and thus the last four transfers (if a full load is to be done) can be reloaded into S1E, S1O, S2E, and S2O. The pipeline effect should be noted with LGB 57a and 57b in that every other clock (3, 5, 7, etc.) is updated with 16 bytes of data to go to the array. FIG. 17B shows the latch timing for the following RMW case. In this figure, the numbered pulses represent latch actuations (data updates) for the associated system transfer number. The numbers in parentheses are logic block reference numbers from FIG. 6.

For a RMW where a prefetch must be done for the first array transfer, the store buffer is fully utilized. It allows the logic to run in two modes at the same time. Part of the logic is buffering the continuous store transfers at the system bus, and part of the logic is doing a prefetch of data over the array bus. In this case, the store buffer is loaded as follows: Latch S1E 125a, then latch S1O 125b; followed by latch S2E 126a, and then latch S2O 126b; while latch S2E 126a is being loaded, latched data in S1E 125a and S1O 125b gets shifted to the respective SB1 latches 127a, 127b; then latch S1E 125a gets reloaded again, followed by latch S2O 126b. Note that when S2E is loaded and the shift is made to SB1 (not shown in FIG. 17B), the prefetched data from the memory access, as denoted by "PRE", is also latched into the memory fetch registers 51a and 51b. As with all fetches, after fetch data is latched in LGB 57, it is also internally looped and latched in LPD 54 for potential use by a subsequent XECC operation. With modifications to the control logic, these same latches can be used to buffer and pipeline cycles with more than eight transfers. RMW cycles that start with direct writes get a slight performance advantage by starting off with pipelined writes like those of the full direct store cycles.

The data flow path for a PW RMW is highlighted in the following discussion. Four system transfers are buffered in latches S1E, S1O, S2E, and S2O 53. At the same time, a prefetch to memory is done. The buffered store data is held while the fetched data is latched into FET latches 51a and 51b, fed through the ECC logic 55a and 55b for single bit correction, if needed, and then latched in the LGB latches 57a, 57b. The case were XECC is activated to handle a multiple bit error will not be covered in this example. The data is then internally looped to LPD latches 54a, 54b. The store multiplexer 122a and 122b is set so S1E and S1O data is fed with looped data into the fetch/store multiplexer circuits 120a, 120b. Note that the fetch/loop multiplexers 121a and 121b must be set to select the looped path and not the memory fetch or redundant bit swap paths. Write enable signals select looped or store buffer data on a byte basis. The new word is then fed through the ECC 55a, 55b and latched into LGB latches 57a, 57b with the newly generated check bits from the ECC logic and the appropriate redundant bit, if needed. Data from the LGB latches 57a, 57b is then stored to memory. The store buffer multiplexer 122a, 122b then selects S2E and S2O latches 126a and 126b. Another prefetch is not done. This selected store data is then fed through the ECC 55a, 55b to generate check bits and then latched into the LGB latches 57a, 57b. This data is then stored to memory.

With this RMW architecture, there is a prefetch option that is not used on this card but could be used to provide additional soft error scrubbing. On this card, when bytes within an ECC word are prefetched but not to be overwritten, the bytes go through the ECC correction logic but are not stored back to memory. If this store were allowed to happen, then a soft error within this non-overwritten ECC word would be scrubbed from memory.

Extended ECC on normal fetch operations is performed to minimize system down time due to occurrences of uncorrectable memory data errors. This is accomplished by using the XECC double complement technique to remove the hard fail from a hard and soft error alignment. This allows the single error correction/double error detection (SEC/DED) ECC to provide correct data on the transfer and to scrub the soft error from memory. Extended ECC is provided for RMW prefetches to allow for a greater number of successful partial store operations. This is ultimately reflected as a reduction of fetch operation related XECC hits and a potential reduction of uncorrectable errors. The XECC delay associated with the partial store is less critical than with a subsequent fetch. For a partial store, the system ties up the bus with the store transfers. Even if a prefetch must be done for the first store data transferred, the card buffers the store data all in one contiguous block and handles all manipulation internally. Thus, the card may be busy during the internal XECC cycle, but the bus could be free for use. For a fetch, XECC delay ties up the bus as the requesting device waits for corrected data to be transferred. Data transfers in this case can have considerable gaps between them if XECC occurs in the middle of a multiple transfer fetch operation.

Without XECC, any double bit error encountered during a RMW prefetch would be uncorrectable. This would be handled as an odd multiple bit error or as an unsuccessful XECC operation would be handled by the present design. The final write to the arrays for that RMW operation would be blocked to maintain the bad, but detectable, data at that location. Thus, the partial store would not take place. This guarantees that a subsequent fetch to that location, unless it is fully overwritten before then, will result in an uncorrectalbe error situation once again.

With XECC, a double bit error consisting of a hard and soft fail could be prefetched and corrected. In this case, no matter where the fails are in relation to the overwritten byte(s), the soft fail will be removed from the location if XECC is successful. Thus, a subsequent fetch will result in only a single bit correction, due to the remaining hard failure, and no XECC to slow down the transfer of data. For a double hard fail, the faults in the arrays that caused the fails can not be corrected, but by allowing the partial store to occur, the overwritten data for one or both of the bits could now match the level at which they are stuck. Thus, data on a subsequent fetch would not show the faults up as bit failures that need XECC to be invoked.

XECC can be activated by double bit errors in one or more ECC sections across the memory port. In this application, there are two ECCs per module, two modules per card, and one or two cards per port. Regardless of the number of ECCs across a port, if only one ECC needs to activate XECC, then all ECCs across the port must perform a similarly timed XECC like action to keep all modules in sync. Synchronization is required for proper array and system operations. The XSYNC and XACKN cross chip communication lines are used to perform this function. For RMW related XECC operations, this means that three different types of internal XECC operations had to be designed in. One XECC operations is the "full" XECC operation where all normal steps in the operation are allowed to occur. The other two are "modified" XECC operations, where certain steps are altered. The need for these an the associated operational steps are described below.

The type of XECC operation performed depends primarily on two things One is the RMW related state of the particular ECC word boundary, and the other is the error within that ECC. There are three types of RMW states: (1) bytes within ECC boundary are fully overwritten, (2) at least one but not all bytes are overwritten, and (3) no bytes are overwritten within the boundary. There are also three types of ECC error states: (1) no errors or a corrected single bit error, (2) even multiple bit error, and (3) odd multiple bit error. If XECC is deactivated on one module within the port, then it must be deactivated for all modules. If a module with XECC active sends out a sync pulse to indicate that it will initiate an XECC operation and a module with XECC deactivated receives the sync signal, the receiving module will activate a checker and operation will cease.

There are two bits in the special function register (SFR) 72 that allow XECC operation for normal fetches and RMW prefetches to be activated or deactivated independently. If all RMW XECCs are deactivated across the port, then a multiple bit error (even or odd) will cause immediate activation of an external uncorrectable error signal (UCE). For debug and diagnostics flexibility, this error signal can be blocked for system operation (fetch errors should not be indicated on stores, only on a subsequent fetch) or enabled for debug. UCE can also be activated for an unsuccessful XECC operation.

The following combination of RMW and error states will result in the occurrence of a "full" XECC operation for that ECC sector. This occurs for a RMW state where at least one byte within the ECC boundary, but not all, is associated with an overwrite and for the error state where an even multiple bit error exists. For this case, some of the prefetched data will remain unaltered, thus, an attempt to correct the errors must be made before a write to memory is made. Different RMW or error states in the other ECC sectors will not affect the full operation for this ECC sector. Step by step detail of this "full" XECC operation is as follows:

INITIAL FETCH (1) Prefetch from memory is activated to facilitate the partial store within an array boundary.

(2) An even multiple bit error exists within the 4B ECC boundary that is associated with this partial store.

(3) A RMW XECC is triggered, the XECC sync signal (XSYNC) for this logic module is activated to get the other module(s) in sync.

(4) Normal fetch error signals are not activated.

(5) The bad prefetched data that has passed from FET latches 51, through the ECC 55, and into LGB latches 57, is then looped form LGB to the LPD latches 54.

(6) No data is put out on the system bus.

(7) Card BUSY is held active throughout the XECC and RMW operation.

INVERT/STORE (1) Data is transferred from LPD latches 54 though an inverting exclusive OR 129 to LGB latches 57. The inversion is done on the data bits (DBs) and the check bits (CBs). Also, the CBs generated by the ECC on the store are blocked.

(2) Inversion in the redundant bit (RB) path is not needed. The point at which the DB and CB paths are fed into the RB store selection logic occurs after the exclusive ORs that do the inversion on the DB and CB data. Thus, inversion for the RB to be swapped is automatically handled.

(3) Data is then stored to memory from LGB latches 57. The same memory location is written as was initially read. Only the array data I/Os for the appropriate ECC(s) is activated to allow the store. This selection is accomplished by only activating the associated array data selects

INVERT/FETCH (1) Data is fetched from the same memory location and latched in the FET latches 51. This data is then fed to the inverting exclusive OR 129 and ECC logic 55. Again, inversion need only be done on the DB and CB since the RB is swapped into these paths prior to the inverting exclusive OR.

(2) ECC correction takes place as with a normal fetch. If both initial fails were hard, then no errors would be detected at this point, and no error lines would be activated. If there was a hard and soft fail, then single bit error signal would be activated, and correction would be done on the DB or CB that is associated with the soft fail.

(3) Corrected data is latched in LGB latches 57 and then looped to and latched in LPD latches 54.

(4) Syndrome registers 56a will be active and controlled according to the associated Special Function Register 72 bit settings for syndrome register enables.

RESTORE (1) For a successful RMW XECC, a restore like that for a command 3XX (normal fetch) XECC is not done. Instead, the invert/fetch blends right into the continuation of the RMW cycle Thus, at this point, XECC can be considered as being complete since the following actions occur for a normal partial write without XECC.

(2) A byte wide selection of the prefetched and corrected data in the LPD latches 54 or the buffered store data 53 is made based on the level of the associated internal Write Enable signals. The store buffer data is selected from latches S1E, S1O, SB1, SB2, S2E, and S2O.

(3) The selected data has check bits generated for it by the ECC, and the appropriate RB swapping takes place. DB, CB, and RB are then latched in LGB latches 57 and stored to memory for this ECC.

(4) The rest of the RMW cycle proceeds as normal.

UNSUCCESSFUL XECC (1) For the case when two soft fails exist, the uncorrectable signal (UCE) will be activated only if the associated SFR bit is set. When this bit is reset, no UCE will be generated. UCE will be activated after associated data is latched into LGB latches 57 and will be held active until it is driven low when card BUSY goes inactive. One clock later, UCE will be put in the high impedance state.

(2) For an unsuccessful RMW XECC, the partial store to memory must not be allowed to occur as directed by the command. However, a restore to memory must occur. This is done to restore data in memory to a state such that, when accessed again, it will still contain a detected but uncorrectable error. The restored data should be exactly the same as that initially fetched. A logic error could alter the data and will only represent a problem if it will cause an escape. This is highly unlikely.

(3) For the restore, a selection between the looped "bad" data in LPD 54 and the buffered store data 53 still occurs. However, the resultant data that is selected with the generated CBs and RB are blocked at LGB 57. Thus, the initial bad data is restored to memory. It has been determined that the XECC steps will not alter the data as initially fetched if XECC is unsuccessful, and this LGB block occurs. The block at LGB, instead of a point earlier in time, was chosen to allow enough time for internal signal feedback to the control logic 65.

It should be noted that no time is added for the restore. The restore as stated here is the continuation of the RMW cycle, as with the case of the successful XECC, with the exception that the initial bad data instead of the modified partial store date is put back into memory.

The following combinations of RMW and error state will result in the occurrence of one of two "modified" XECC operations for that ECC sector. "Modified 1" XECC occurs for the following cases: (1) RMW state where at least one byte within the ECC boundary, but not all, is associated with an overwrite and for the error state where a single bit error or no error exist in this ECC but a multiple error exists in another ECC, and (2) RMW state where all bytes in ECC are fully overwritten or not written at all for any error state. For this case, XECC steps are the same as for the "full" XECC except for the following:

INVERT/STORE (1) Data from LPD latches 54 to LGB latches 57 is not inverted.

(2) Data in LGB 57, for this ECC, is not stored to memory.

INVERT/FETCH (1) The fetch from memory is allowed, but the fetched data is blocked internal to the logic at logic blocks 121 by the selection of latched LPD data.

(2) LPD data is not inverted before being latched in LGB 57.

(3) Associated UCE error signal is blocked for this ECC.

(4) LGB data is looped back to LPD, then RMW continues as normal.

(5) Thus, the modified XECC keeps the actions of this ECC sector in sync with those of the ECC sector(s) that are doing the full XECC operation. However, the data initially fetched is unaltered by the logic and held through the XECC. This held data is then used for the selection between stored data to overwrite or fetched data to be unaltered for the case where the partial store is associated with this ECC. This is done to reduce the risk of having good data in this ECC sector disturbed by doing unnecessary stores and fetches with memory.

"Modified 2" XECC occurs for a RMW state where at least one byte within the ECC boundary, but not all, is associated with an overwrite and for the error state where an odd multiple bit error exists. Different RMW or error states in the other ECC sectors will not affect the operation for this modified XECC. For this case, the XECC steps are the same as for the "full" XECC except for the following:

INITIAL FETCH (1) Same as full XECC except that internal uncorrectable error signal (IUCE) is activated at prefetch time. External UCE will be activated if the associated SFR bit is set and will be held active to the end of the cycle even if the full XECC on the even multiple bit error within another ECC sector is successful.

INVERT/STORE (1) Same as "modified 1" XECC.

INVERT/FETCH (1) Same as "modified 1" XECC except that UCE is not blocked and RMW does not continue as normal. Instead, the following actions occur that make this XECC unique: Selection between bad data in LAED 54 and buffered store data 53 after the XECC operation is allowed to occur, and the result is latched into LGB but the inverted data is not stored to memory. Since the initial bad data in memory was never altered by the XECC operations, this bad data is preserved by blocking the store.

This modified XECC performs the same function as the other modified XECC by keeping this XECC synchronized with those of the ECC sector(s) that are doing the full XECC operation and by keeping the associated data undisturbed by holding the data and not going to that portion of memory during the XECC. However, since an odd multiple bit error was associated with this ECC, the error could not be corrected. Thus, after the XECC, the normal RMW store associated with the prefetch is blocked to preserve the data in memory that is detectable.

One other RMW state exists where a multiple bit error occurs in the prefetch. A RMW state where at least one byte within the ECC boundary, but not all, is associated with an overwrite and for the error state where a single bit error or no error exists in this ECC and only odd multiple bit error(s) exist in the other ECCs. In this case, no XECC is activated, and a normal RMW operation is performed. This ECC will allow a resultant overwrite to go to memory. The ECC associated with the odd MBE will have any overwrite blocked and will allow UCE to be activated if SFR bit is set.

The subject invention has a soft error removal (scrub) mechanism that is performed fully on the memory. It is activated by the normal process that the system uses to initiate the on-card refresh of the dynamic random access memories (DRAMs). The system activates one refresh line at an average rate of once every 15.6 microseconds. Refresh control through the use of an on-card refresh counter common with the prior art. The unique part in the subject invention is that the soft error scrub function is tied to this refresh in a transparent manner.

The memory card in the IBM 9370 processor had the capability to do soft error scrubbing, but it was never implemented by the system. The scrub capability was not transparent and consisted of two system activated commands that performed a basic The two starting byte address bits are ignored. Thus, one scrub operation to a card on the bus will tie up the bus for two command cycles. This mode of scrubbing would greatly impact memory availability and the associated system performance if the entire memory space had to be scrubbed often. In other words, ECC words from a memory location were read out, and ECC logic was used to correct single bit error(s). The zero byte modify write then allowed the corrected original data to be put back at the same location without external over-writes. If the single bit errors were soft, then this two step process scrubs them out.

According to the subject invention, a transparent method uses the same basic two step process, except the system does not have to impact memory availability by tying up the memory bus with commands. With this scheme, one memory card on the bus can be doing a transparent refresh/scrub that does not tie up the bus, while another card can be using the bus for a fetch and store. The on-card refresh and scrub counters eliminate the need for data and address transfers on the bus. Note that a hard fail is one in which the associated array bit is physically damaged and always stuck at one value. A soft fail is one in which the bit/cell is not damaged. In this case, radiation (alpha particle) or noise has caused the data to change to an incorrect state. This error can be easily fixed by just putting the correct data back in via the scrub process.

Soft errors can accumulate over time in sections of a large memory space. Running a soft error scrub routine through the entire memory space at a defined interval will assure that soft failures will not accumulate in any seldom used sections. Tying scrub in with refresh accomplishes this nicely since refresh must also be done throughout the entire memory space at regular intervals. The counter set up in FIG. 18 allows the more frequent refresh rate to be scaled to the less frequent scrub rate to ensure that memory availability is not impacted. It is important to scrub out the soft errors to minimize the occurrence of two soft errors lining up in any one ECC word. ECC logic in conjunction with the Extended ECC logic (double complement retry) can detect and correct two hard or one hard and one soft failure combinations but can not correct two soft failures that line up. This is detectable but will result in an uncorrectable error that may impact system operation. A soft failure lining up with two hard failures, which may be more likely, could present a more serious situation where the ECC logic would miscorrect the error. In this case, an undetected error could escape; thus, soft errors should be kept in check to prevent a build up that might cause this to occur.

The memory card according to the subject invention uses the on-card RMW hardware to do a transparent zero byte write scrub operation. This will be described with reference to FIGS. 18, 19 and 20. The transparent scrubbing is accomplished by intermixing it with refresh. As far as the arrays are concerned, a fetch at a word line location is the same as a refresh. The on-card scrub logic makes use of this by doing a scrub, i.e., a fetch and store operation, in place of refresh.

Figure 19:
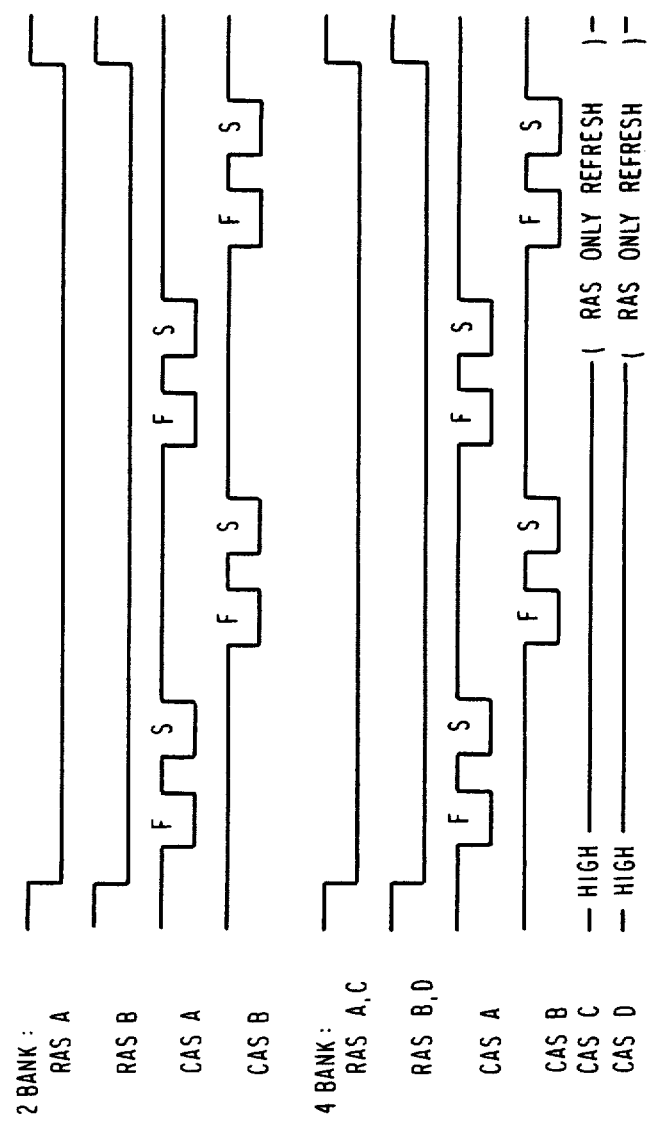
FIG. 19 is a timing diagram showing the scrub timing operation.

When the system determines that a refresh is needed, it activates the card refresh signal (REF). If the associated special function register bits are set such that scrubbing is off, then the refresh cycle only consists of two staggered array refreshes. If the bits have scrubbing active and the associated counters indicate that a scrub is to be done, then the scrub cycle consists of four fetch and store scrub operations split between two array banks. If there are four array banks, then the other two banks do two refreshes during this time. Refer to FIG. 19.

FIG. 19 is used to illustrate how scrubbing is intermixed with the refresh command operation. When only refreshing is to be done (not shown in the figure), the RAS lines to the memory arrays are all activated. The CAS lines are held inactive. This does a RAS-only refresh to all arrays on a two bank card. Two refreshes are done with the one refresh command to take advantage of a shortened cycle time for the pair. For two bank scrubbing, the pair of refreshes is replaced by two scrub pair operations. Two scrubs must replace one refresh, since two banks can be refreshed at one time, but only one bank can be scrubbed at a time. This is due to the fact that no data is transferred with the arrays on a refresh, but it must be done for scrubs. Due to data I/O dotting of the banks, only one bank can be transferring data at any one time. For the four bank case, when two banks are being scrubbed, the other two banks are being refreshed, all based on the respective address values in the scrub and refresh counters at that time.

When the refresh/scrub operation is completed, then the card BUSY line goes inactive to indicate that the card is available. All addressing for refresh or scrub operations is handled by internal counters. Thus, the system only needs to activate one signal line to a card to do scrubbing. Since no addresses have to be sent, then the refresh command activation does not tie up the bus at any time and only ties up the card for one command cycle.

Two scrub operations are needed to replace one refresh operation since a refresh can be done on eighty arrays simultaneously, but a fetch and store operation can only be done on one bank (forty arrays) at a time. Thus, the full scrub cycle looks like back-to-back RMW cycles that each consist of array-transfer-based "PP" operations (based on system transfers it would be PWWP).

Each module has a refresh counter and a scrub counter, as shown in FIG. 18. In FIG. 18, the row address bits (0-9) of the refresh counter correspond to the word lines of the arrays that must be refreshed at a predefined interval. After the card is powered up and both this counter and the scrub counter are reset to zeros (assume positive logic), a data match will exist between the scrub counter and the refresh counter.

The following example will assume that the SFR 5 bit setting is 01. As shown by the nine capital Cs in the associated row of the diagram, when bits 1-9 of the refresh counter match row address bits 1-8 and * of the scrub counter, a pair of double scrub operations is done. Thus, a scrub is done on the first refresh command. Each time a refresh command is activated, a pair of refresh operations is done (two word lines) and thus bit one of the refresh counter gets updated. Each time a pair of double scrubs is done, bit one of the column address of the scrub counter gets updated. Thus, after the first refresh command, the previously reset registers will have one values at these two bit one locations. Now when the second refresh command comes along, nine comparison bits no longer match. Therefore, no scrubbing is done, only refreshes.

As more refreshes occur at the prescribed interval, the refresh counter will continue to be incremented, and the scrub counter will remain at the first count increment. When all the card memory locations have been refreshed, refresh counter bits 0-9 will again be all zeros and bit A of the counter will have a one value. With the 01 setting, the A, B and C bits of the register are a "don't care" functionally as the counter increments through this range. Only the count related to bits 0-9 is of concern. Each loop through this range means that the card has been fully refreshed. Since bits 1-* of the row address of the scrub counter are still at zero, each loop of the refresh counter will activate the scrub operation when the comparison bits (C) are all zero. Thus, as the key refresh counter bits are looped, the scrub counter counts up through the column address bit range such that every column address on the card for that particular row address has had its associated data scrubbed.

Once all the column addresses have been counted through for that particular row address, the above process will be repeated for each row address as the scrub counter count now progresses through its row address bits. The count will proceed until the scrub count reaches the maximum for the nine column bits and the nine row address bits. At this point, the card with the smallest address space has been fully scrubbed and the scrub process starts over. For cards with larger memory spaces, the scrub count will continue into the A, B or C bits, depending on the card size. From this description, it can be seen that scrubbing is distributed over time, and not done in spurts.

The scrub operation across the entire port is controlled by only one module For one card ports, it is the left module. For two card ports, it is the left module on the left card. In this controlling module, the refresh and scrub counters are compared to determine when scrub should occur.

The scrub counter is incremented each time a scrub is done. The scrub counter can only be reset by the system via scanning or by the RESET line and the scrub and the refresh should both be reset (all 0s) after power up. The scrub operation is synchronized across a port through the use of sync and acknowledge lines. Cross chip lines also ensure that the chip counters stay at the same values across the port. This checking eliminates the need for parity predict checker circuitry for each counter.

The fetch and store operation of the scrub proceeds in the following manner. Data is fetched from one array location (16 bytes), and the ECCs are used to correct up to a single hard or soft fail each. Whether an ECC fail is hard or soft, or if no fail occurred, corrected data is internally looped, internal Write Enable lines are all set to prevent any data from being overwritten. Then the data is driven onto the array bus. If a single bit error was corrected, then array data selects for that associated ECC are activated to put correct data back to the same address location. The net result of this is that any single soft error in that memory location will be removed. If no error was corrected, then the data selects associated with that ECC will not be activated. This is done to keep the good data in memory from being disturbed by a possible bad data transfer from the logic. An internal checker exists to prevent scrub operations from occurring when other special function register related diagnostics are active. This prevents the possibility of improper data manipulation during scrub operations that may impact data integrity.

At the present time, extended ECC (XECC) is not done during scrub. If it were to be employed, then a single soft fail that had lined up with a hard fail could be scrubbed from memory. The double inversion steps of the XECC would remove the hard fail and allow the SEC/DED ECC to correct the single soft fail. A restore to memory in this case would be allowed to fix the bad data associated with the soft fail. In the case where XECC is not done, a fetch with two or more bad bits would prevent a store to the arrays, as is the case with no error. This will prevent the possibility of a mis-corrected triple bit error from being restored to memory, thus allowing bad data to escape during a subsequent fetch at that location. No error signals are generated during the scrub operation for this case. The error signals will get generated when a system fetch is done at that location.

Two bits in the special function register are used to control the scrub rate. The card logic enables the system to preset the scrub rate via the 060 diagnostic write command or by serial scanning into the latches at power up (or at any other time). The 060 command loads the special function register (SFR) via the multi-use data bus. These bits are decoded to allow for not scrubbing (default), continual scrubbing (should be used for testing purposes only), and two different system scrub rates. The number of FREQ bits in the scrub and refresh counters determine these rates. It should be noted that continual scrubbing means that a scrub is done on each refresh activation (typically every sixteen microseconds). The continual rate is available to reduce manufacturing test times associated with testing of the scrub function. System use would be limited to debug or diagnostic operations.

Scrubbing at a selected rate will be done in a distributed manner. Thus, a fixed number of scrubs will be intermixed with pure refresh cycles in such a way that a constant time between scrubs exists. For this design, there is no logic to compensate for variable card size. Thus, as the card memory size increases, the time to scrub the entire card will increase for a particular scrub rate setting. It is possible to design the logic to maintain a constant memory space scrub rate for the entire range of card sizes. However, this would create different memory availability percentages for different card sizes within the system. Thus, increases in system memory could be perceived by the customer as a performance degradation. Refer to FIG. 20 for examples of implemented scrub rate numbers and availability impact.

FIG. 20 is used to illustrate the rates of the four settings. It also shows that by tying scrub with refresh, and running scrub at a slower rate, that there is no decrease in availability above that set by refresh. Two register bits, SFR q and r, are decoded to pick the scrub rate. The default setting (00), which is not shown, turns the scrub off. Thus, no scrubbing is done during any refresh operation. The 01 setting selects the faster of the two operational rates, and the 10 setting picks the slower rate. As described with reference to FIG. 18, these rates can be adjusted by changing the number of bits in the refresh and scrub counters and how they are compared. The 11 setting is used to do a continuous scrub operation; that is, each refresh command activates a scrub operation. This is used to speed up test of the scrub operation. For this test, one would put soft errors at each memory location that can be scrubbed and run scrubs at this rate for the two to sixteen seconds needed to exactly hit each location. Then a check of memory would be done to see that all soft errors were scrubbed. The bottom portion of FIG. 20 shows that availability impact for the two operating scrub rates (settings 01 and 10) is almost zero and shows that the system would not want to run scrub at the 11 test setting.

Prior art for adjustability does not make sense since the IBM 9370 processor memory card did not have self contained scrub. If scrub were to be used in that system, the rate of the associated zero-byte read-modify-write (RMW) commands would have to be controlled. Moreover, while the 9370 memory card included an special function register (SFR), it was much more primitive and did not include the q and r bits. The 9370 memory card had only four bits in the SFR, whereas the subject invention uses an SFR with twenty-four bits allowing for a great deal more flexibility and function.

Briefly summarizing, placing the error correction code (ECC) and all the array control on each memory card provides for optimum design flexibility. This flexibility allows the array usage to be transparent to the system through the use of a fixed interface. The key component of this interface, as illustrated in FIG. 3, is the "multi-use data bus" 43 and 44 Only physical to logical conversions for the array failure isolation during system diagnostics are not transparent; however, this variability can be handled via software/code modifications. Also, by placing ECC on the memory card, along with internal checkers and built-in diagnostic operations, the system is able to easily isolate the failing card (and logic or array components) on a multiple memory card bus. This does much to enhance the error detection and fault isolation (EDFI) numbers associated with the memory.

The key here is that this flexibility allows for memory migration and memory back-up strategies with a common interface. For example, a system with four slots for main store memory may have a base memory requirement of 32 MB (four 8 MB cards) and a maximum memory requirement of 256 MB (four 64 MB cards). Thus, it is desirable that each card type be plug compatible. However, to get the range of card densities, different array technologies with different configurations must be used, such as $256K \times 4$ arrays for the 8 MB card and $1M \times 4$ arrays for the 64 MB card. In addition, for some or all of these card offerings, back-up cards with alternative arrays may be needed for supply reasons. In some cases, the alternative technology may lack key features like data selects. The on-card logic can be reconfigured to match, or come close to matching, existing card function and performance without modification to the interface. In addition to array density changes, performance enhancements can also be achieved while maintaining the interface and only changing the clock rate.

"Smart" card logic can also maintain the interface while providing for improved reliability through use of different ECC codes or added redundancy, and providing for improved data transfer rates by increasing the amount of on-card interleaving. The plug compatibility and performance flexibility offered by this interface and architecture allows the same memory card to be used by a processor with or without the benefit of a cache memory.

The "multi-use data bus", that makes up the majority of the "fixed" interface, minimizes the number of dedicated lines required for the interface. In addition to reducing module I/O count, this bus also provides for the simplicity and flexibility of this interface. Reducing the number of dedicated signals simplifies the timings that need to be supplied by the system. The internal logic of the "smart" memory card buffers the system from the complicated timings tat must occur internally to provide for the large variety of functions available. Complicated and varying array timings for the range of array hardware to be used on-card are generated by the properly initialized internal logic 46 and 47 shown in FIG. 3. Initialization and personalization of the control logic, as shown in the block diagram of FIG. 5, is accomplished by loading the program register 71 with the proper code. The system need only activate the card select (SEL) signal and provide command, field length, address to initiate a card operation. For a store operation, data is then immediately multiplexed over the same multiuse data bus. For a fetch, data transfer occurs a short time after the command/address data is removed from the bus, rather than immediately. For some diagnostic operations, no data transfer is required at all. For any of these cases, after activation and possible data transfer the system then waits for the inactive state of card BUSY that indicates the operation is complete.

The on-card logic also reduces the number of system timing cases needed by performing a great number of functions internally with hardware. Some are automatically triggered by command activated events: (1) A fetch command could automatically trigger an internal Extended ECC operation if multiple bit errors exist in the data from the internal array bus; (2) Read-Modify-Write is activated during a system write command. The card uses field length and starting address supplied at select time to determine if a direct write or read- modify-write is to be done. Some internal functions are triggered or controlled by a preset internal control register 72 in FIG. 5 and an associated external event: (1) Automatic soft error scrubbing is triggered by the combination of a special function register setting, internal counter relationship, as depicted in FIG. 8, and activation of the refresh (REF) signal (2) Read or write without ECC, data loop operations, and other diagnostic operations are controlled by special function register settings and the activation of normal fetch or store operations.

The generic nature of the data bus itself provides much of the interface flexibility. The individual assignments across the bus can be varied for different bus usages, without affecting the overall bus definition. Changes to the functional order of the bits can easily be made at almost any point during development or for future upgrades without major system impact.

addition to bit variations across the fixed bus width, the bus depth can also be easily varied for any functional change or upgrade. This is done by adding (or removing) branches of the input and/or output multiplex function. For example, if more checkers are added late in a design cycle, or in a follow-on design, then these checkers can be read out by an existing diagnostic command with one or more data output transfers internally added on. The referred to branching for the output multiplex function is depicted in FIGS. 4 and 7. The data output select logic 59 is used to select between data for normal fetch operations (input a) or diagnostic fetch data (input b).

The referred to checker data transfer addition in the example can be shown in FIG. 7. Existing diagnostic paths are shown going into multiplexer (MUX) 73. If needed, more diagnostic lines can easily be added by expanding the multiplexer 77 or by adding a like multiplexer that feeds input 3 of multiplexer 74. As another example, when more fetch or store data transfers from memory are needed to improve vector processor performance, added internal paths are not even needed. In this case, provided there are enough field length bits, the internal array control logic need only be modified to allow more array CAS activations to occur during the cycle. This utilizes more of the array page mode capability by allowing more sequential data transfers between system and memory.

The invention also accomplishes a reduction in chip count as is shown by comparing FIG. 2 with FIG. 3. The 9370 logic in FIG. 2 is distributed over six separate logic modules 26a, 26b, 26c, 29, 30 and 31. The next generation memory shown in FIG. 3 has only two separate logic modules. These are designed in such a way that only one logic part number is needed, and personalization for module location on the card is controlled by tying a control input either high or low. Similar function to that of the data flow module 30 in FIG. 2 is related to module 46 section (a) of FIG. 3; likewise, for modules 31 and 47(a). The control module 29 translates into sections (b), (c) and (d) split across both modules 46 and 47. The array control redrive modules 26a, 26b and 26c have like function shown in section (e) split between modules 46 and 47.

While the invention has been described in terms of a single preferred embodiment, those skilled in the art will recognize that the invention can be practiced with modification and incorporating more or less of the disclosed features within the spirit and scope of the appended claims.

Having thus described our invention, what we claim as new and desire to secure by Letters Patent is as follows:

1. An improved smart memory card architecture of the type including a memory array communicating with a system bus via on-card logic, said on-card logic comprising:
   first latch means connected to receive data from said memory array for temporarily storing said data;
   error correction code means connected to receive data from said first latch means for performing error detection and correction on said data;
   second latch means connected to receive data from said error correction code means for temporarily storing said data; and
   data output select means connected to receive data from said error correction code means and said second latch means for selectively transmitting data to said system bus;
   wherein said first latch means, said error correction code means and said second latch means each comprise odd and even parts, said data output select means being connected to receive data from both odd and even parts of said error correction code means and said second latch means, said on-card logic further comprising control means for controlling said data select means to interleave data from said odd and even parts.

2. The improved smart memory card architecture as recited in claim 1 wherein said memory array includes an internal memory bus which is n-bytes wide and said system bus is n/2-bytes wide, said data output select means interleaves n-byte wide data from said error correcting code means and said second latch means to form contiguous n/2-byte data on said system bus in response to said control means.

3. The improved smart memory card architecture as recited in claim 1 wherein said data output select means comprises:
   slow multiplexer means connected to receive data from said odd and even parts of said second latch means for selectively passing data therefrom in response to said control means; and
   fast multiplexer means connected to receive data from said odd and even parts of said error correction code means and from said slow multiplexer means for selectively passing data therefrom in response to said control means.

4. The improved smart memory card architecture as recited in claim 3 further comprising:
   internal data loop register means connected to receive data from said error correcting code means for temporarily storing said data; and
   flow select logic means connected to receive data from said internal loop register means and said first latch means for selectively supplying data therefrom to said error correcting code means, said internal data loop register means and said flow select logic means providing an optimized error correction code path for said data.

5. The improved smart memory card architecture as recited in claim 4 further comprising memory store buffer means connected to receive data from said system bus for temporarily storing said data, said flow select logic means also being connected to receive data from said memory store buffer means, said memory store buffering means buffering data during a read-modify-write operation to said memory array.

6. The improved smart memory card architecture as recited in claim 1 wherein said control means comprises:
   array control means for activating said memory array for fetch and store operations;
   data flow control means for performing diagnostic and self test operations;
   supervisor control means for controlling said array control means and said data flow control means;
   control bus means for interconnecting said array control means, said data flow control means and said supervisor control means; and
   clock means connected to each of array control means, said data flow control means and said supervisor control means for supplying synchronizing clock pulses thereto.

7. The improved smart memory card architecture as recited in claim 6 wherein said array control means includes:
   refresh counter means for counting refresh cycles of said memory array;
   scrub counter means for counting soft error scrub operations performed on said memory array; and
   wherein said control means further compares counts in said refresh and scrub counter means for controlling back-to-back zero byte read-modify-write operations to said memory array to effect said soft error scrub operations, said soft error scrub operations being performed transparently during a refresh operation.

8. The improved smart memory card architecture as recited in claim 6 wherein said data flow control means includes special function register means for modifying how commands are executed in the data flow and how data flow paths are configured for any operation.

9. The improved smart memory card architecture as recited in claim 6 wherein said supervisor control means includes program register means for personalizing operations of the card based on system input as determined by what kind of card types are plugged in and what the system configuration is.

10. The improved smart memory card architecture as recited in claim 6 wherein said array control means includes:
    refresh counter means for counting refresh cycles of said memory array;
    scrub counter means for counting soft error scrub operations performed on said memory array; and
    wherein said control means further compares counts in said refresh and scrub counter means for controlling back-to-back zero byte read-modify-write operations to said memory array to effect said soft error scrub operations, said soft error scrub operations being performed transparently during a refresh operation;
    wherein said data flow control means includes special function register means for modifying how commands are executed in the data flow and how data flow paths are configured for any operation; and
    wherein said supervisor control means includes program register means for personalizing operations of the card based on system input as determined by what kind of card types are plugged in and what the system configuration is.

11. The improved smart memry card architecture as recited in claim 10 further comprising:
    memory store buffer means connected to receive data from an external system bus for temporarily storing said data;
    internal data loop register means connected to receive data from said error correcting code means for temporarily storing said data; and
    flow select logic means connected to receive data from said first latch means, said memory store buffer means and said internal loop register means for selectively supplying data therefrom to said error correcting code means.

* * * * *

UNITED STATES PATENT AND TRADEMARK OFFICE
CERTIFICATE OF CORRECTION

PATENT NO. : 4,888,773
DATED : December 19, 1989
INVENTOR(S) : David L. Arlington et al.

It is certified that error appears in the above—identified patent and that said Letters Patent is hereby corrected as shown below:

Column 1, line 21, after (RAM) insert a period.
Column 1, line 40, after "cards" insert a period.
Column 3, line 3, after (RMW) insert a period.
Column 3, line 26, change "he" to --the--.
Column 3, line 29, after "controls" insert a period.
Column 4, line 51, delete the comma.
Column 5, lines 3 and 4, change "read-write-modify" to --read-modify-write--.
Column 7, line 53, delete "each" (first occurrence).
Column 9, line 48, change "≠" to --16--.
Column 14, line 23, after "HEX" insert --060--.
Column 18, line 32, delete "Store:".
Column 18, between lines 32 and 33, insert --Store:--.
Column 18, line 36, delete "Fetch:".
Column 18, between lines 36 and 37, insert --Fetch:--.
Column 18, line 46, delete "Store:".
Column 18, between lines 46 and 47, insert --Store:--.
Column 18, line 47, delete "Fetch:".
Column 18, between lines 47 and 48, insert --Fetch:--.
Column 19, line 22, delete "only".
Column 22, line 10, after "test" insert --is--.
Column 25, between lines 20 and 21, insert "SUM    00010011".

UNITED STATES PATENT AND TRADEMARK OFFICE
CERTIFICATE OF CORRECTION

PATENT NO. : 4,888,773

DATED : December 19, 1989

INVENTOR(S) : David L. Arlington et al.

It is certified that error appears in the above—identified patent and that said Letters Patent is hereby corrected as shown below:

Column 26, line 67, after "block" insert --115--.

Column 29, line 38, correct "uncorrectable".

Column 30, line 2, change "an" to --and--.

Column 30, line 5, after "things" insert a period.

Column 30, line 7, after "error" insert --state--.

Column 30, line 57, change "form" to --from--.

Column 31, line 38, after "cycle" insert a period.

Column 33, line 61, after "basic" insert --fetch followed by a zero byte modified write.".

Column 36, line 23, after "module" insert a period.

Column 38, line 13, after "44" insert a period.

Column 38, line 61, correct "that".

Column 39, line 27, change "8" to --18--.

Column 39, line 28, after "signal" insert a period.

UNITED STATES PATENT AND TRADEMARK OFFICE
CERTIFICATE OF CORRECTION

PATENT NO. : 4,888,773

DATED : December 19, 1989

INVENTOR(S) : David L. Arlington et al.

It is certified that error appears in the above-identified patent and that said Letters Patent is hereby corrected as shown below:

Column 39, line 40, before "addition" insert --In--.

Signed and Sealed this

Sixth Day of August, 1991

*Attest:*

HARRY F. MANBECK, JR.

*Attesting Officer*     *Commissioner of Patents and Trademarks*